US010309797B2

(12) United States Patent
Mays et al.

(10) Patent No.: US 10,309,797 B2
(45) Date of Patent: Jun. 4, 2019

(54) USER INTERFACE FOR DISPLAYING NAVIGATION INFORMATION IN A SMALL DISPLAY

(71) Applicant: HERE GLOBAL B.V., Veldhoven (NL)

(72) Inventors: Joseph Mays, Quincy, IL (US); Desiree Sauter, Berlin (DE)

(73) Assignee: HERE Global B.V., Eindhoven (NL)

( * ) Notice: Subject to any disclaimer, the term of this patent is extended or adjusted under 35 U.S.C. 154(b) by 152 days.

(21) Appl. No.: 14/577,468

(22) Filed: Dec. 19, 2014

(65) Prior Publication Data

US 2016/0178383 A1    Jun. 23, 2016

(51) Int. Cl.
*G01C 21/34* (2006.01)
*G01C 21/36* (2006.01)

(52) U.S. Cl.
CPC ..... *G01C 21/3682* (2013.01); *G01C 21/3673* (2013.01)

(58) Field of Classification Search
None
See application file for complete search history.

(56) References Cited

U.S. PATENT DOCUMENTS

| 6,256,582 | B1 * | 7/2001 | Helmstadter | G01C 21/3632 340/990 |
| 9,146,129 | B1 * | 9/2015 | Furio | G01C 21/3682 |
| 9,400,189 | B2 * | 7/2016 | Beyeler | G01C 21/3682 |
| 9,464,909 | B2 * | 10/2016 | Chen | G01C 21/3682 |
| 2003/0060971 | A1 * | 3/2003 | Millington | G01C 21/20 701/454 |
| 2006/0259238 | A1 * | 11/2006 | Jung | G01C 21/3676 701/533 |
| 2007/0073463 | A1 * | 3/2007 | Sherony | G08G 1/165 701/45 |
| 2007/0253596 | A1 * | 11/2007 | Murata | G06K 9/6203 382/103 |
| 2008/0095402 | A1 * | 4/2008 | Kochi | G01C 11/00 382/103 |
| 2009/0112389 | A1 * | 4/2009 | Yamamoto | B60C 23/0401 701/31.4 |
| 2009/0169052 | A1 * | 7/2009 | Seki | G06T 7/0044 382/103 |
| 2009/0322502 | A1 * | 12/2009 | Ozaki | G08G 1/166 340/435 |
| 2010/0054541 | A1 * | 3/2010 | Chen | G08G 1/166 382/107 |
| 2010/0066566 | A1 * | 3/2010 | Reusser | G01C 23/00 340/971 |
| 2010/0134264 | A1 * | 6/2010 | Nagamine | B60Q 9/005 340/435 |
| 2010/0164706 | A1 * | 7/2010 | Jeng | B60Q 9/007 340/459 |

(Continued)

*Primary Examiner* — Nicholas K Wiltey
(74) *Attorney, Agent, or Firm* — Lempia Summerfield Katz LLC

(57) ABSTRACT

Methods and systems for generating a navigation interface on a mobile device are described herein. A mobile device may identify its current location which may comprise a current path on which the mobile device is located. The mobile device may identify a plurality of upcoming paths and/or points of interest within a predetermined distance of the current location and generate one of various types of display.

17 Claims, 17 Drawing Sheets

(56) References Cited

U.S. PATENT DOCUMENTS

| | | | | |
|---|---|---|---|---|
| 2010/0217483 A1* | 8/2010 | Matsuno | G08G 1/165 | 701/36 |
| 2010/0305842 A1* | 12/2010 | Feng | G01C 21/3679 | 701/533 |
| 2010/0328055 A1* | 12/2010 | Fong | B60Q 9/005 | 340/425.5 |
| 2011/0010088 A1* | 1/2011 | Nagase | G01C 21/3655 | 701/533 |
| 2011/0029239 A1* | 2/2011 | Okude | G01C 21/367 | 701/431 |
| 2011/0224900 A1* | 9/2011 | Hiruta | G01C 21/3469 | 701/533 |
| 2011/0298988 A1* | 12/2011 | Kawai | G06T 5/006 | 348/699 |
| 2012/0027258 A1* | 2/2012 | Uchida | G06K 9/00805 | 382/103 |
| 2012/0133769 A1* | 5/2012 | Nagamine | B60R 1/00 | 348/148 |
| 2012/0136865 A1* | 5/2012 | Blom | G06F 17/30141 | 707/739 |
| 2012/0235805 A1* | 9/2012 | Nogami | G06T 7/2006 | 340/441 |
| 2012/0323484 A1* | 12/2012 | Zhang | G01C 21/3697 | 701/423 |
| 2013/0107051 A1* | 5/2013 | Maruoka | H04N 7/183 | 348/148 |
| 2013/0223686 A1* | 8/2013 | Shimizu | G08G 1/166 | 382/103 |
| 2015/0307093 A1* | 10/2015 | Sasabuchi | B60W 30/0953 | 701/1 |

* cited by examiner

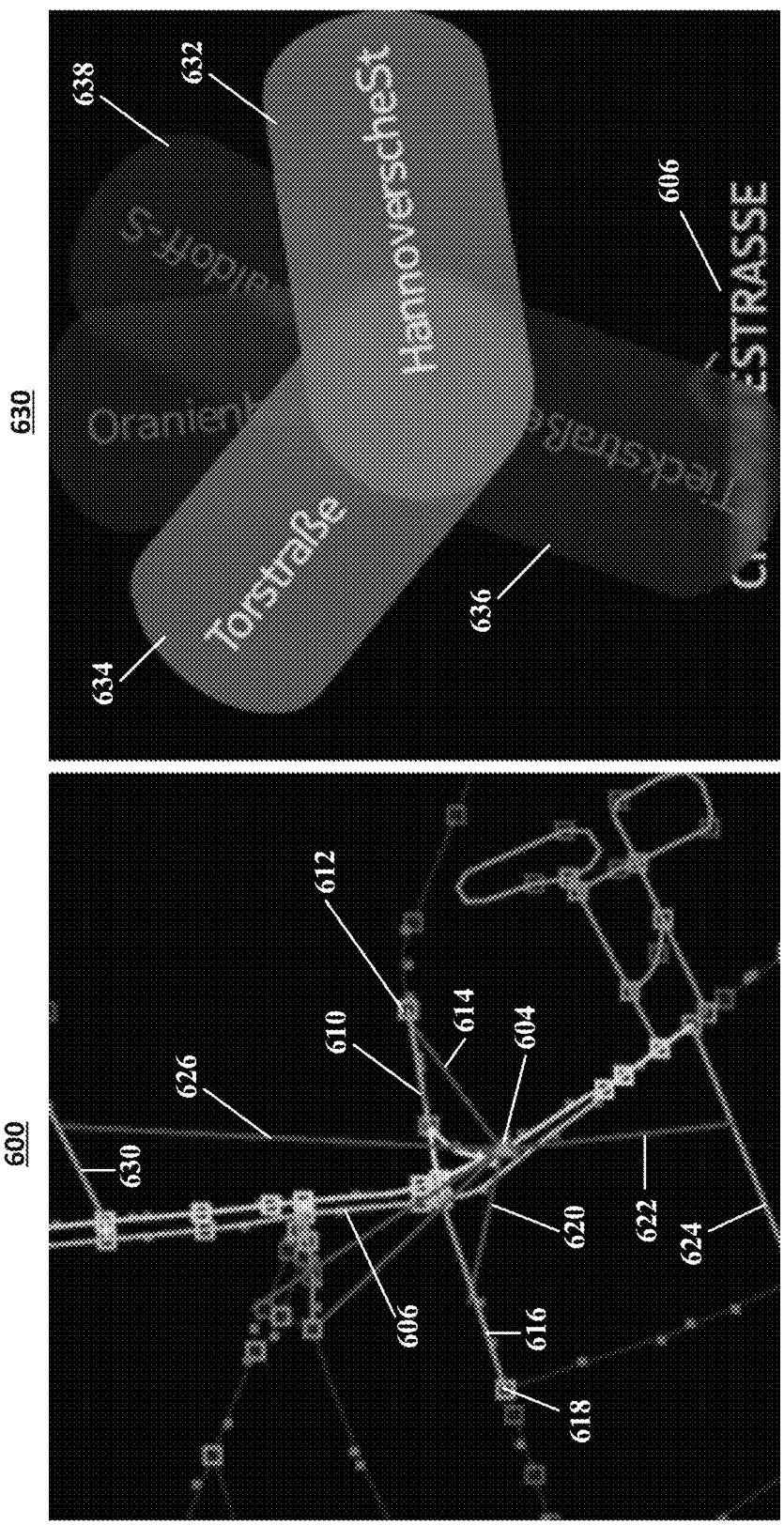

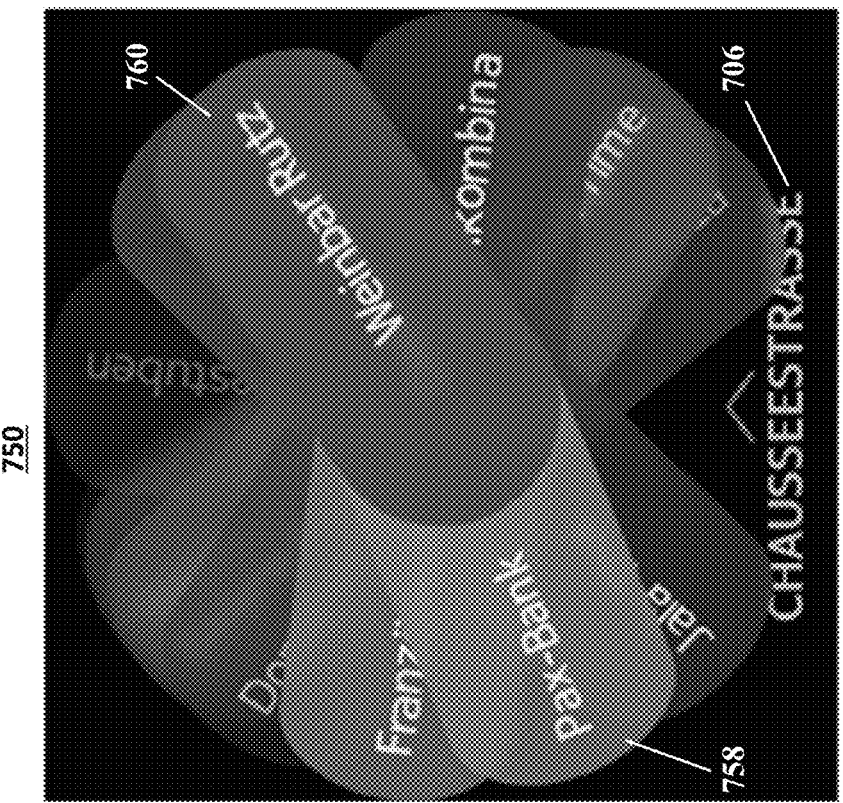
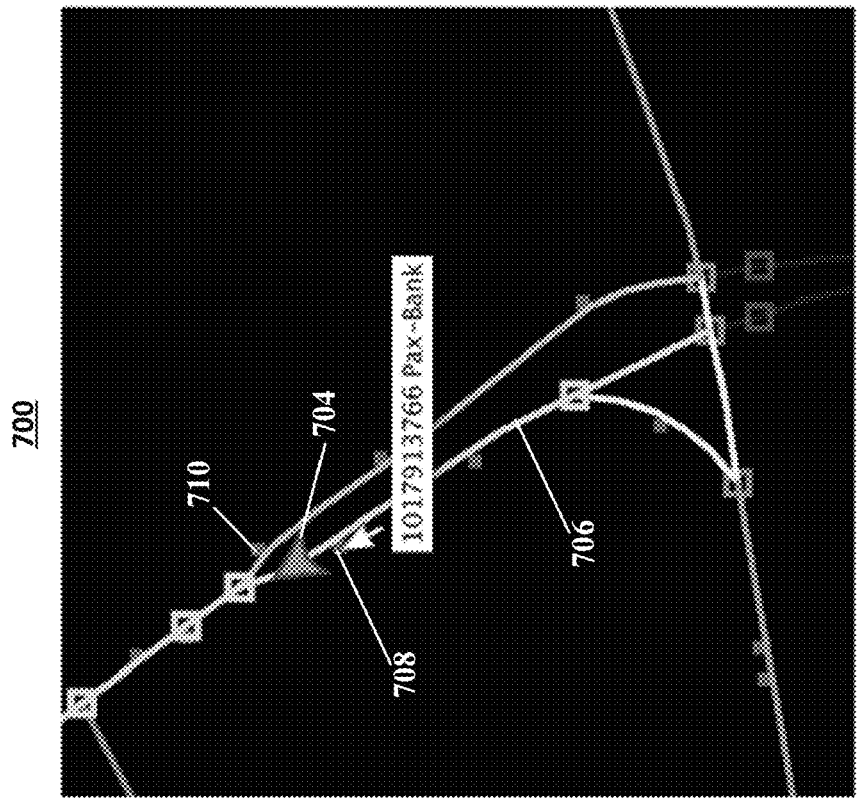
FIG. 7A
FIG. 7B

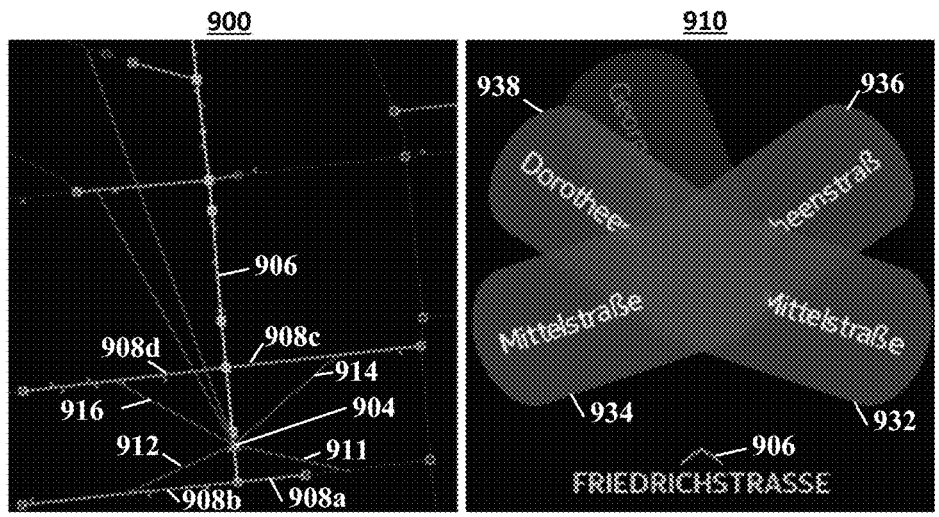
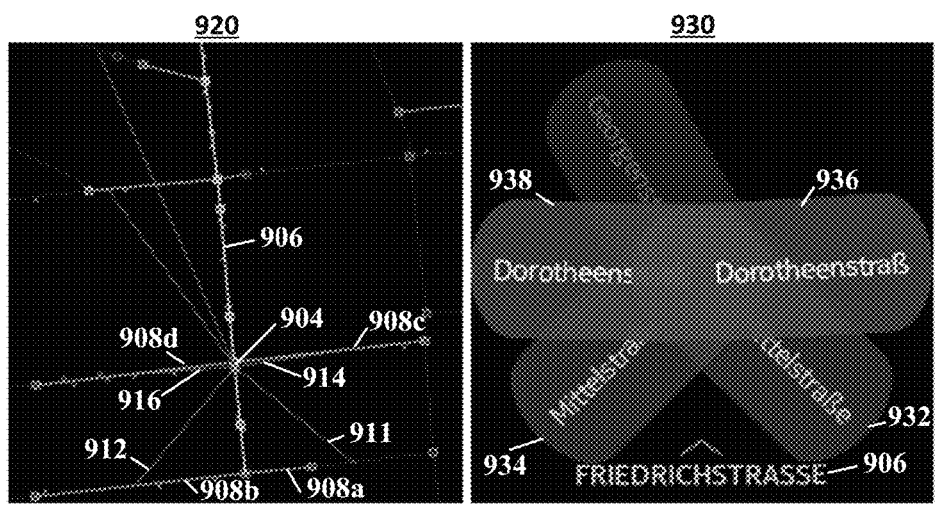
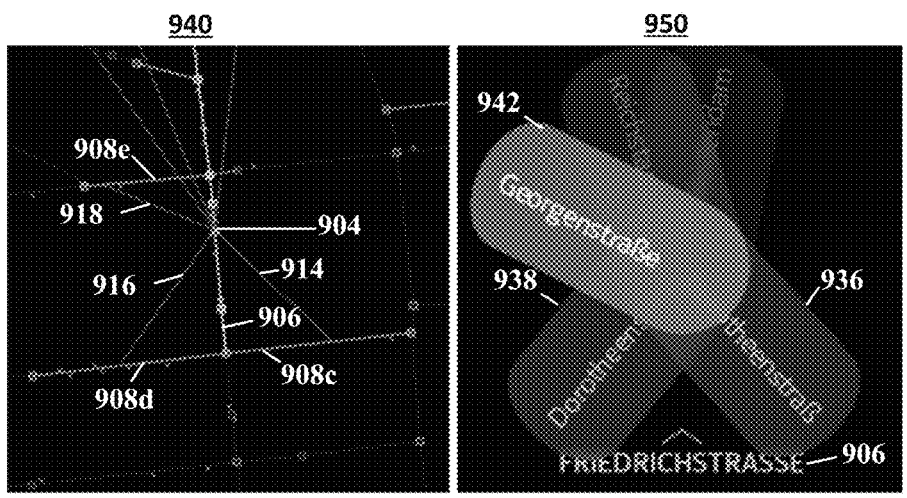
FIG. 9A
FIG. 9B
FIG. 9C

USER INTERFACE FOR DISPLAYING NAVIGATION INFORMATION IN A SMALL DISPLAY

BACKGROUND

The availability of navigation software on mobile devices has resulted in a proliferation of use of mobile mapping applications by pedestrians to explore a city by walking. Conventional mobile mapping applications display maps geographically with varying levels of detail displayed on the mobile map depending on the zoom level of the map. Users need to zoom out of the map to find upcoming areas but need to zoom in to be able to see details. Zooming in and zooming out redraws the map displayed on the mobile mapping application with an appropriate level of detail for the selected zoom level. Such frequent zooming in and zooming out, especially in areas with poor signal coverage, is time consuming and distracting.

The proliferation of wearable mobile devices such as smart glasses (digital eyeglasses) and smartwatches has increased the need for mapping applications able to render on smaller display screens. Rendering the display of conventional mobile mapping applications on such small display screens is often troublesome. Drawing maps with accurate geographic scale on such small screen with features discernible to the user poses a problem. Such maps require the user to constantly zoom in and out to be able to gain enough context to be aware of upcoming roads and the details of their immediate vicinity. As such, existing mobile mapping applications may prove to be inefficient or incapable of providing the user with an efficient manner of displaying their immediate vicinity and upcoming paths on a small display screen.

SUMMARY

This Summary is provided to introduce a selection of concepts in a simplified form that are further described below in the Detailed Description. This Summary is not intended to identify key or essential features of the invention.

Embodiments include, without limitation, a computing device that, for example, may identify a current location and a current path on which the computing device is located. The computing device may identify one or more upcoming objects in a vicinity of the current path. For each of the one or more upcoming objects, the computing device may determine an object direction vector corresponding to that upcoming object, the corresponding object direction vector representing a direction from an intersection between the upcoming object and the current path to a projected point located on the upcoming object at a predetermined distance from the intersection. The computing device may determine a relative direction vector corresponding to that upcoming object, the corresponding relative direction vector representing a direction from the current location to the projected point. The computing device may generate a display comprising a label identifying each of the one or more upcoming objects. A display position of each of the labels may be based on the relative direction vector corresponding to that upcoming object.

Additional embodiments and details are disclosed herein.

BRIEF DESCRIPTION OF THE DRAWINGS

Some embodiments are illustrated by way of example, and not by way of limitation, in the FIGS. of the accompanying drawings and in which like reference numerals refer to similar elements.

FIG. 6A illustrates an example rendering of an electronic horizon that is used to generate the second navigation interface illustrated in FIG. 6B, FIG. 6C, and FIG. 6D in accordance with various embodiments. FIG. 6B, FIG. 6C, and FIG. 6D illustrate example embodiments of a second navigation interface in accordance with various embodiments.

FIG. 7A illustrates an example rendering of an electronic horizon that is used to generate the second navigation interface displaying a point of interest illustrated in FIG. 7B in accordance with various embodiments. FIG. 7B illustrates an example embodiment of a second navigation interface displaying a point of interest in accordance with various embodiments.

FIGS. 9A, 9B, and 9C illustrate example screenshots of the second navigation interface display that updates as the user walks through a city in accordance with various embodiments.

DETAILED DESCRIPTION

In the following description of various embodiments, reference is made to the accompanying drawings, which form a part hereof, and in which various embodiments are shown by way of illustration. It is to be understood that there are other embodiments and that structural and functional modifications may be made. Embodiments of the present invention may take physical form in certain parts and steps, examples of which will be described in detail in the following description and illustrated in the accompanying drawings that form a part hereof.

Typical mobile applications for displaying map data require that the user zoom out of a map displayed on his mobile device while walking around to be able to gather enough context for the upcoming roads surrounding his location as well as zoom in to gather information on his immediate surroundings and to gauge how his current location is updating with respect to the map. Such zooming in and zooming out is time consuming and often requires the map to be redrawn and rendered on the mapping application every time the zoom level is changed, which is often time consuming given the quality of the available data connection of the mobile device. Additionally, a grid-like map interface may be hard to accurately render and read on a small mobile device screen.

According to several embodiments described herein, the mobile device may generate different navigation interfaces that provide the user with information on upcoming roads, as well as context on roads that are located further away from the user, all the while dynamically updating the display of the navigation interface to reflect the change in the pedestrian user's location with respect to the roads surrounding them. In particular, a 'fishbone view' navigation interface, a 'flower view' navigation interface, and a 'radar view' navigation interface are described. More details on these different navigation interfaces will be provided below.

Many embodiments will be described in terms of road maps. The methods and system architectures described herein may be applied to other types mapping user interface technologies. For example, although the disclosure has been described in the context of road maps, the methods and system architectures described herein may be applied to different types of maps, such as topographic maps, military maps, city infrastructure maps, thematic maps, economic maps, climate maps, etc.

Figure 1:
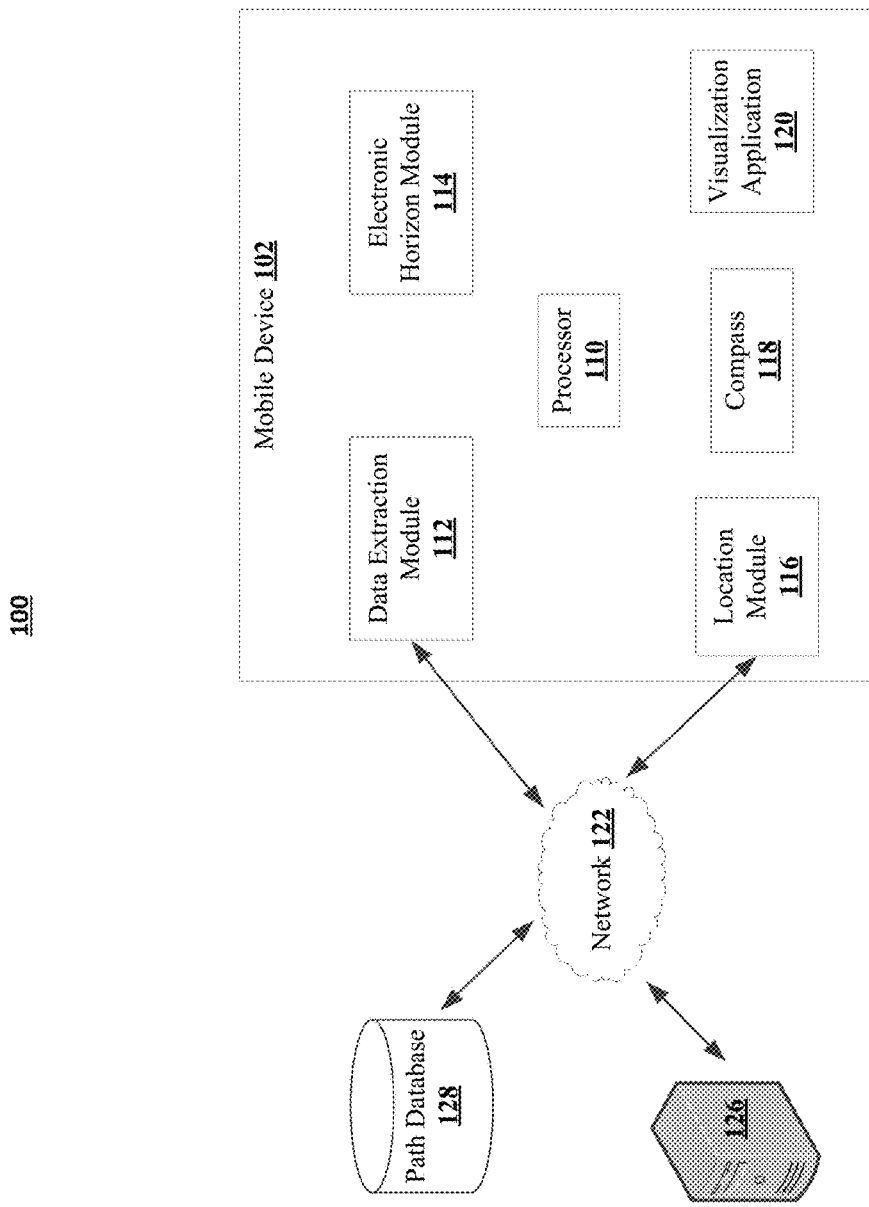
FIG. 1 depicts an illustrative example of a system architecture for generating navigation interfaces in accordance with various embodiments.

FIG. 1 depicts an illustrative example of a system architecture for generating navigation interfaces. The example depicts a networked environment 100 where a mobile device 102 generates different navigation interfaces. The mobile device 102 may communicate with external server(s) 126 and databases over network 122. The mobile device 102 may be a mobile computing device such as a mobile phone, a smartphone, a portable media player, a tablet computing device, a laptop computing device, a smart watch, a smart glass (e.g., Google Glass), or any other mobile computing device. Additional details of mobile device 102 according to at least some embodiments are discussed in connection with FIG. 13.

In some embodiments, the mobile device 102 may include a data extraction module 112 that retrieves path data from a remote location. A module such as data extraction module 112, electronic horizon module 114, and location module 116 may be a combination of program instructions configuring processor 110 and hardware elements. For example, data extraction module 112 may include I/O circuitry that communicates with network 122, as well as program instructions that communicate instructions between processor 110 and the I/O circuitry. The data extraction module 112 may extract road data from one or more sources, such as satellite data, traffic maps, real estate maps, national geologic map database, user reported map data, terrain maps etc. For ease of illustration, such map data is shown as being retrieved from path database 128 over network 122 by the data extraction module 112 in FIG. 1. For example, the path data may be retrieved from a remote server that compiles path data from different sources and formats the path data to identify intersections, the names of the paths, and different nodes along the various paths. The path data may also specify the geometric arrangement according to which different paths are connected and/or are arranged with respect to one another. The path data may also classify different structures in the map as different functional classes. For example, highways may be classified as a different functional class than a pedestrian only road. Different road structures may be classified as different functional classes. For example, four way intersections, five way intersections, and roundabouts may be classified under different functional classes. Additionally, the path data may include access characteristics. For example, the path data may include information on whether the path is accessible to pedestrians or not. Such access data may be used in determining whether a road (hereinafter also referred to as 'path' or 'link') identified in the path data should be generated as a path in the navigation interface generated for display to a pedestrian user on mobile device 102. In some embodiments, some or all of a particular path may include or consist of a road, trail, track, or other type of course that is dedicated to pedestrians.

In some embodiments, path data for each road may include identification information such as a name and road number(s). Such identification information may be retrieved by the data extraction module 112 and matched with a corresponding road. For example, the data extraction module 112 may identify names of roads from a different source than the source from which road layout information is retrieved. The data extraction module 112 may compile path data from different sources and may correlate the path data and related information such as names, functional classes of roads, road geometry obtained from satellite data, and road naming convention to generate a map and/or an electronic horizon as described below.

In addition to retrieving information on roads, the data extraction module may also identify the location and identification information for points of interest (POI). For example, the data extraction module 112 may identify general points of interest such as movie theaters, restaurants, ATMs, shopping centers. The data extraction module 112 may also identify points of interest that are specific to the user of mobile device 102. For example, the processor 110 may identify that the user is interested in fitness centers and will identify locations and names of fitness centers. The mobile device 102 may identify the name, location, and the side of a road on which the POI is located. Middleware software may be used to match the POI data with the path data extracted from the data extraction module 112 to create a composite path data used in the generation of the navigation interfaces described herein.

The mobile device 102 may also be able to determine its current location and bearing. For example, the mobile device 102 may include a location module 116 that is able to identify the current location of the mobile device 102. For example, location module 116 may include GPS communication circuit(s) that communicate(s) with satellites directly or indirectly through other computing devices over network 122 to obtain the position of the mobile device 102, and program instructions that communicate instructions between processor 110 and the GPS communication circuit(s). The location module may also include additional hardware such as an accelerometer to detect the speed of the user's movement and program instructions that communicate instructions between processor 110 and such additional hardware. Information detected by the accelerometer may be used by the processor 110 to update the navigation interfaces in an accurate and timely manner. Additionally or alternatively, the mobile device 102 may obtain its location by connecting over a wireless network such as network 122. The mobile device 102 may detect signals from nearby wireless access points and may determine signal strength from such access points. The mobile device 102 may refer to a database of wireless networks, which may indicate where each uniquely identified access point is located. By using the determined signal strength of each wireless access point, the mobile device 102 may be able to determine distance from each wireless access point to pinpoint the location of the mobile device. Other methods may be used to identify the location of the mobile device 102 such as communicating with wireless beacons, inertial sensors located on the mobile device 102, etc., in addition or as alternatives to the methods described above. The mobile device 102 may also be able to identify its own bearing using an on-board compass 118. For example, the compass 118 on mobile device 102 may be a magnetometer that is able to determine the bearing in which the mobile device 102 is moving. The processor 110 of the mobile device 102 may use such location and bearing information along with the path data and the POI data to generate navigation user interfaces described herein.

In some embodiments, the mobile device 102 may use the path data and POI data retrieved by the data extraction module 112 to generate an electronic horizon. An electronic horizon may be a model that provides information on upcoming paths and POIs near the current location of the mobile device 102 and determines the most likely path that a pedestrian would take. For convenience, an upcoming path or POI within a vicinity of the current location of a mobile device may be generally referred to as an object. By accumulating path information, POI data, and the current location, the mobile device 102 may extract geographic and road features that are within a predetermined distance of the current location of the mobile device 102 to predict the most likely path that mobile device 102 will take. By analyzing path information about the road segments lying ahead, such as road geometry, functional road class, number of lanes, speed limits, traffic signs etc., and by correlating such path information with historic walking data logged by the mobile device 102, the time of day, and the interests of the mobile device 102 user, the mobile device 102 may determine the most likely path that the pedestrian user of the mobile device 102 will take. In addition, the mobile device 102 may also determine the opportunities for potential diversions from the calculated most likely path. For example, by correlating the extracted path information near the current location, the mobile device 102 may determine which paths that are within a predetermined distance of the current location will intersect with the most likely path. The mobile device 102 may also identify landmarks and/or POIs that exist along the calculated most likely path. The electronic horizon module 114 may generate a representation of paths near the current location of the mobile device 102 that intersect the current path that the user is walking on as the electronic horizon. The electronic horizon module 114 may include hardware that communicates with data extraction module 112 and processor 110. The electronic horizon module may include program instructions that facilitate communication between processor 110, data extraction module 112, and the hardware components of electronic horizon module 114. The program instructions of electronic horizon module 114 may specify how an electronic horizon may be generated and how the processor should interpret the electronic horizon to generate different navigation interfaces.

In some embodiments, electronic horizon information may be used by the processor 110 to generate different navigation interfaces described herein. The processor 110 may use electronic horizon data to determine how to arrange the display of different navigational elements of the multiple navigation user interfaces described herein. At least three different types of navigation user interfaces may be generated from such electronic horizon data: the fishbone view navigation interface, the flower view navigation interface, and the radar view navigation interface. While this disclosure focuses mostly on these three exemplary navigation user interfaces, other variations and/or combinations of these navigation interfaces may be generated by the mobile device 102 using the electronic horizon data in accordance with the various embodiments described herein.

In some embodiments, the mobile device 102 may generate a display of the navigation interfaces using a visualization application 120. The processor 110 may generate data required to generate a display of the navigation interfaces. Once such computation has been performed, the processor 110 may load such generated data into the visualization application 120 to generate a display of the navigation interfaces described herein.

Figure 2A:
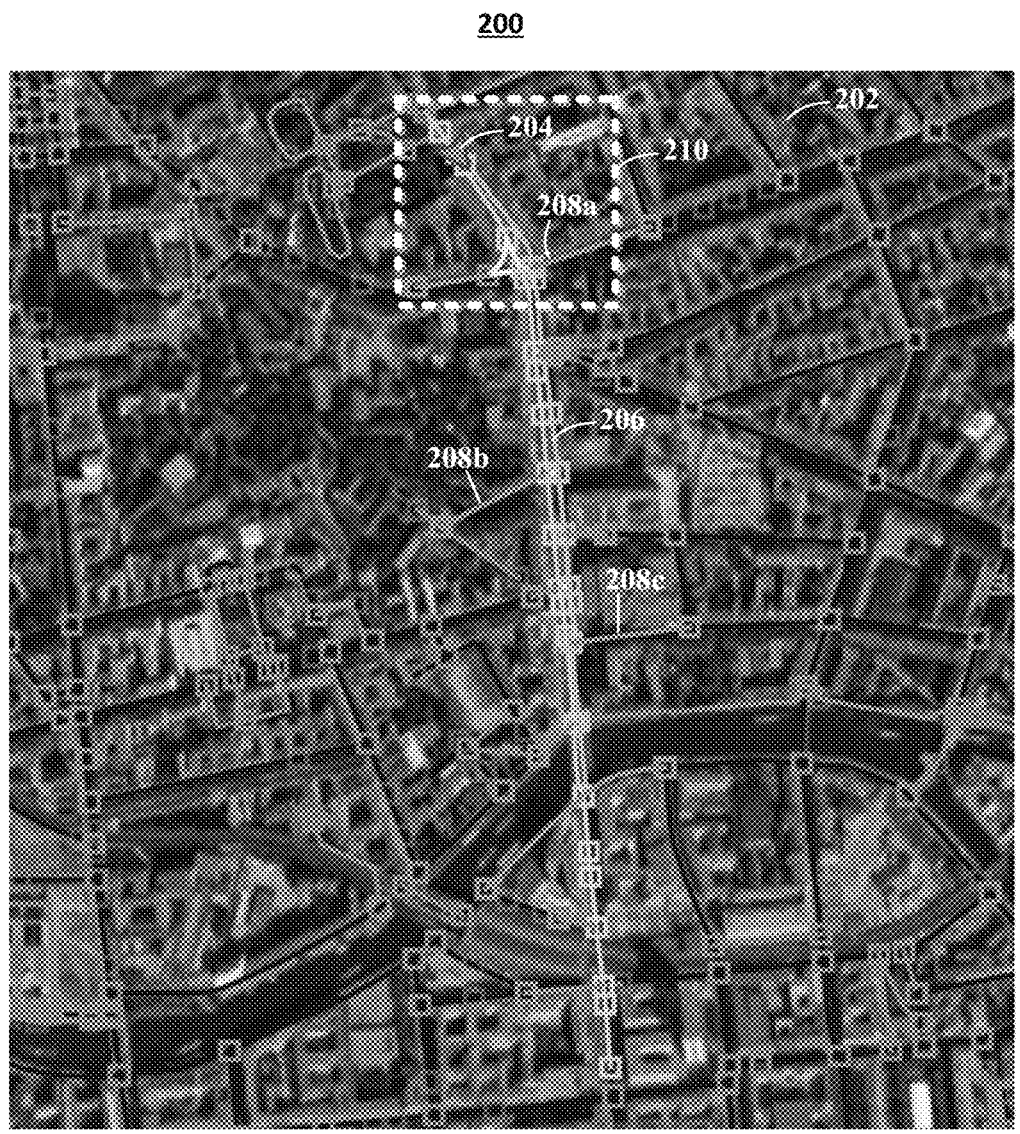
FIGS. 2A and 2B illustrate an example rendering of an electronic horizon used to generate navigation interfaces in accordance with various embodiments.

FIG. 2A illustrates an example rendering of an electronic horizon 200 used to generate navigation interfaces. The electronic horizon 200 may include the current location 204 of the mobile device, a most likely path 206 that the user of the mobile device is most likely to take, and various different potential diversions 208a, 208b, and 208c from the most likely path 206.

The electronic horizon 200 may be a collection of data in which the data identifies a current location, a current path, upcoming potential paths, potential diversions, and POIs that are linked to data representing positions of real-world objects (e.g., roads). The electronic horizon 200 may be represented as a sequence of road sections that are connected to each other at intersections. The electronic horizon 200 may be a representation of a road network from the perspective of a pedestrian. The electronic horizon may reside in the processor/memory of the mobile device and serve as the basis from which various displays are generated. The electronic horizon may not necessarily be displayed on the mobile device to a mobile device user who is browsing the navigation interface. However, the electronic horizon data may be rendered for display in a diagnostic mode to an application developer or in a separate computer system as part of the application development process.

In some embodiments, the electronic horizon 200 may be overlaid on a map 202. The electronic horizon 200 may not be displayed to the mobile device user who is browsing the navigation interface. However, the electronic horizon 200 may be displayed to an application developer who develops different navigation interfaces to be displayed on the mobile device. The mobile device may only display the final navigation interfaces generated using the electronic horizon 200 to its user in a standard operating mode.

The electronic horizon 200 may be a representation used by the processor of the mobile device to generate navigation interfaces described herein. The electronic horizon 200 identifies roads near the current location of the mobile device and in particular identifies the roads that the user has a high probability of walking on and how such roads are laid out geometrically with respect to one another. The mobile device may represent such information captured in the electronic horizon 200 in different display formats to generate different navigation interfaces.

In order to generate electronic horizon 200, the mobile device may process the road data and POI data according to a set of different policies. One such policy used to generate the electronic horizon 200 may be that pedestrians prefer to understand their surroundings from the point of view of what is ahead of them. The mobile device may identify the direction that a user of the mobile device considers as 'ahead of him' by identifying the current location and bearing of the mobile device. Instead of arranging a map arranged according to north, west, east, or south, the electronic horizon 200 may be arranged such that the representation identifies roads from the point of the pedestrian associated with the mobile device who is heading in the same bearing as the identified bearing of the mobile device. Having identified the current location of the mobile device, the mobile device may identify a path on which the user is currently walking on, hereinafter also referred to as the current path. The mobile device may identify the direction in which the user is walking using direction information from a compass such as compass 118. By identifying the user's walking direction, the mobile device may identify the direction of the current path. The most likely path 206 may be identified by identifying the bearing of the user's current path in this manner and by relating such information to the extracted road data.

Another policy that may be used in generating the electronic horizon 200 for pedestrian use may be to identify scenarios in which to not attempt to predict a likely path 206. For example, the mobile device may not predict a most likely path 206 through roundabouts, and forks in the road. Since the pedestrian may select one of many different options at such intersections, which will then lead to different sets of diverging paths intersecting with the different roads past the fork or roundabout, the mobile device may choose to not calculate the most likely path 206 through such intersections. When such a functional class of intersection is encountered on the most likely path 206, the mobile device may terminate the most likely path 206 at that intersection until the user has chosen which path to take past such an intersection. The mobile device may prompt the user to indicate which path the user intends to take. Additionally or alternatively, the mobile device may monitor the user's current location and once the user passes the intersection, the mobile device will be able to determine which of the multiple paths the user has chosen. Once the mobile device determines which path the user has chosen, the mobile device may continue to predict the most likely path 206.

Figure 2B:
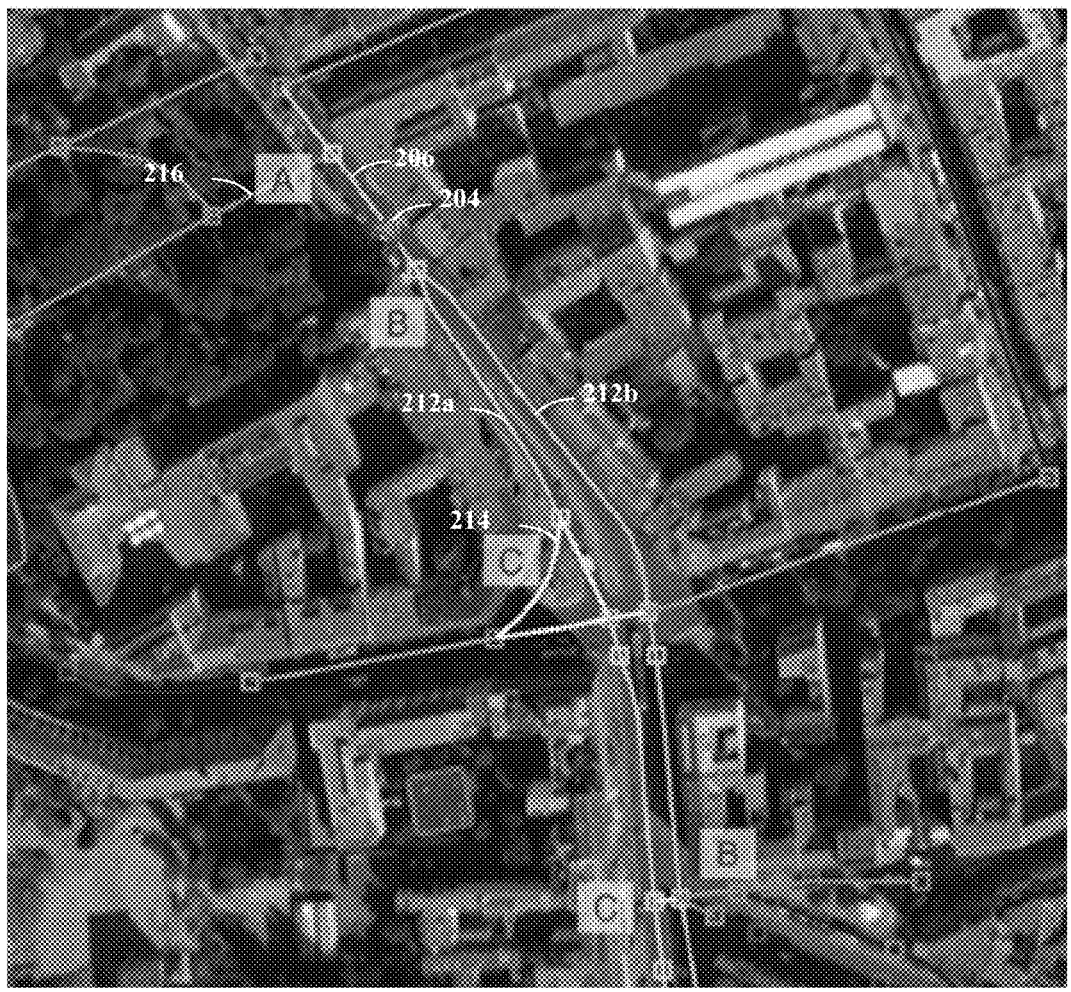

FIG. 2B illustrates portion 210 of the electronic horizon 200 of FIG. 2A. As seen in FIG. 2B, the most likely path 206 may be doubly digitized. For example, road 212a and road 212b may be part of the same path 206. The path 206 may, for example, have a median in the middle separating the two roads 212a and 212b. Since the electronic horizon 200 may be generated from satellite data and/or map data that indicates roads 212a and 212b as separate roads, the mobile device may be configured to identify that roads 212a and 212b are two digits of the same path 206. The electronic horizon 200 may resolve the road data to process roads 212a and 212b as the same path when used for generating a navigation interface. Similarly, the mobile device may be configured to resolve internal intersections such as path 214 as part of a nearby intersection. For example, path 214 may be a ramp or a turn only lane for an intersection. The mobile device may resolve such internal intersections such as path 214 which are part of a preexisting intersection. The mobile device may group such internal intersections with preexisting intersections to avoid cluttering a navigational interface. Lanes that are part of complex intersections which do not present different diverging options from the most likely path 206 besides the intersections that have already been noted in the electronic horizon data 200 may be consolidated with previously existing intersections.

In some embodiments, the electronic horizon 200 excludes unnamed roads, private roads, and unpaved roads. For example, unnamed private path 216 is not included in the electronic horizon data to calculate intersections to be displayed in a navigation interface. Since such roads are often found to be dead ends, the mobile device may exclude such paths from being considered for drawing navigation interfaces.

In some embodiments, the electronic horizon 200 may be generated using the extracted road data and applying the policies described above. For example, the most likely path 206 may be determined by matching the current location 204 and bearing of the mobile device with extracted road data. The most likely path 206 may be represented as a combination of a plurality of paths and may be determined by traversing straight through the plurality of paths. Road names and function classes for the most likely path 206 may be identified. The most likely path 206 may be terminated when a dead end path and/or a special functional class change (e.g., roundabout, fork in the road) is encountered along the most likely path 206. Intersections may be determined along the most likely path 206 and other roads that provide the user with options for turning (e.g., potential diversions 208a, 208b, and 208c) are identified for these intersections. Intersections of the most likely path 206 with unnamed roads, roads in which pedestrians are not allowed, unpaved roads, and private roads may be excluded from the electronic horizon 200. Furthermore, by using conditional random field (CRF) processing algorithms, internal intersection paths such as path 214 and multiply digitized roads such as roads 212a and 212b may be resolved to ensure that the electronic horizon 200 is not unduly cluttered with additional roads that do not present the pedestrian with any potential diversions other than the ones previously identified for intersections.

Figures 3A, 3B:
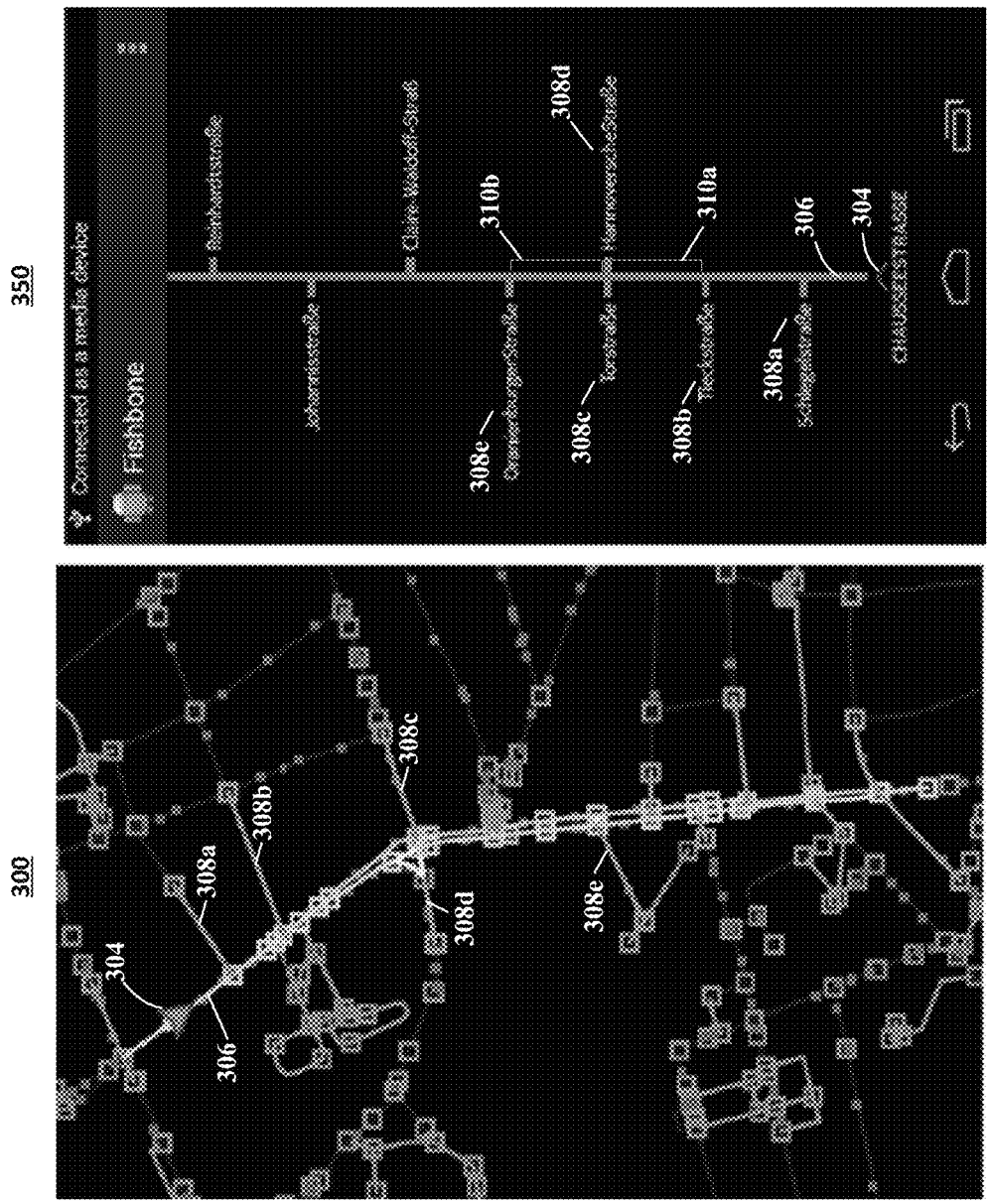
FIG. 3A illustrates an example rendering of an electronic horizon that is used to generate the navigation interface illustrated in FIG. 3B in accordance with various embodiments.
FIG. 3B illustrates an example embodiment of a first navigation interface in accordance with various embodiments.

FIG. 3A illustrates an example rendering of an electronic horizon 300 that is used to generate the navigation interface 350 illustrated in FIG. 3B. FIG. 3B illustrates an example embodiment of a first navigation interface, hereinafter also referred to as a 'fishbone view' navigation interface.

By using the electronic horizon data 300 illustrated in FIG. 3A, a mobile device may generate a 'fishbone view' navigation interface 350 as shown in FIG. 3B for display on the mobile device. The current location 304 of the mobile device may be displayed on the bottom of the navigation interface 350. The most likely path 306 that is determined from the electronic horizon data 300 may be displayed as a vertical line 306 on the navigation interface 350. Roads that intersect the most likely path 306 may be displayed as connected to the left or right side of the most likely path as potential diversions 308a, 308b, 308c, 308d, and 308e. Each path that is marked on the navigation interface 350 may include a text label identifying the name of the path. The name of the road may be extracted from the road data and/or the electronic horizon 300.

Roads that intersect the most likely path on the left and the right may be connected to the vertical line 306 at the same point. For example, potential diversions 308c and 308d may be connected at the same point to vertical line 306 representing the current path that the user is located on. The electronic horizon data may be analyzed to determine whether two sides of a road intersecting the most likely path 306 are named the same. If they are named differently, as shown by the four way intersection formed between potential diversions 308c, 308d, and vertical line 306, the names of the differently named roads on either side of the vertical line 306 are displayed on the navigation interface 350.

In some embodiments, the spacing between different potential diversions may be fixed. For example, spacing 310a between potential diversions 308b and 308c may be set to be the same fixed length as spacing 310b between potential diversions 308c and 308e on the navigation interface 350. The navigation interface 350 may be generated to have fixed spaces in between each intersection displayed on interface 350 regardless of the actual distance between the intersections according to extracted map data.

In some other embodiments, the spacing between different potential diversions and/or intersections on the navigation interface 350 may be of variable length. For example, the spacing may be proportional to the actual distance between the intersections according to the extracted road data. Additionally or alternatively, the proportional spacing between the different potential diversions on navigation interface 350 may be capped or floored at predefined maximum and minimum values. Accordingly, the representation of some intersections on the navigation interface 350 may be spaced close together than others that are spaced farther apart in reality.

Figure 4B:
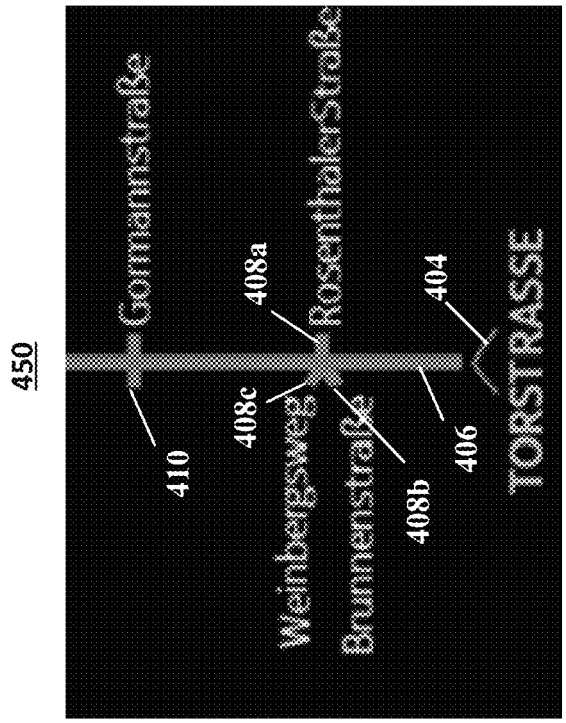
FIG. 4B illustrates an example embodiment of the first navigation interface display of a five way intersection in accordance with various embodiments.
Figure 4A:
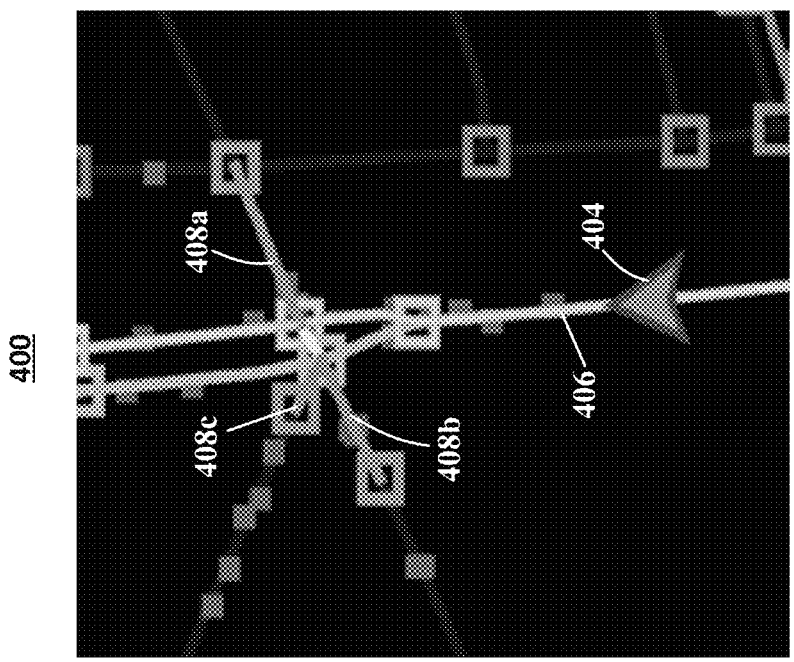
FIG. 4A illustrates another example rendering of an electronic horizon that is used to generate the first navigation interface illustrated in FIG. 4B in accordance with various embodiments.

As shown in FIGS. 4A and 4B, the 'fishbone view' navigation interface 450 may display multiple road intersections in a simple uncluttered manner. For example, a five way intersection near the mobile device's current location 404 may include potential paths 408a, 408b, 408c, and the most likely path 406. The electronic horizon 400 may be analyzed to determine the geometric arrangement of potential paths 408a, 408b, and 408c. Upon determining that potential paths 408a, 408b, and 408c intersect with the most likely path 406, the mobile device may generate their corresponding display in the fishbone view navigation interface 450. Intersections with more than one path on one side of the vertical line/most likely path 406 may be displayed on the navigation interface 450 using ticks angled based on the order of the paths in the intersection. For example, by analyzing electronic horizon 400, it may be determined that potential paths 408b and 408c lie on the left side of the most likely path 406 and that potential path 408b lies closer than potential path 408c from the perspective of the current location 404 of the mobile device. Accordingly, the navigation interface 450 may display ticks for potential path 408b closer to the indicator 404 for the current location than the tick for potential path 408c.

In some embodiments, the mobile device may determine from the electronic horizon data that potential path 410 intersects the most likely path 406. The mobile device may determine whether the potential path 410 is named the same on both sides of path 406. In situations such as these, a four way intersection with two roads is displayed on the navigation interface 450 in a simplified manner by rendering text only once for each of the two roads. For example, the intersection with potential path 410 (e.g., the path 410 along the road named Gormanstraße) and most likely path 406 generates a four way intersection in which both paths have the same names before and after the intersection. In this case, the navigation interface 450 displays the name of the potential path for the tick 410 placed on both the right and the left side of vertical line 406 only once, as shown in FIG. 4B.

Potential paths other than the most likely path 406 may be indicated as abbreviated paths (or "tick marks") crossing the most likely path 406. If one of these potential paths is chosen (e.g., the pedestrian user turns down one of those potential paths), the navigation interface may update such that the potential path that the user has chosen will expand to become the vertical line and the navigation interface may be redrawn indicating that the previously potential path that the user has turned onto is now the most likely path.

Figures 5A, 5B, 5C:
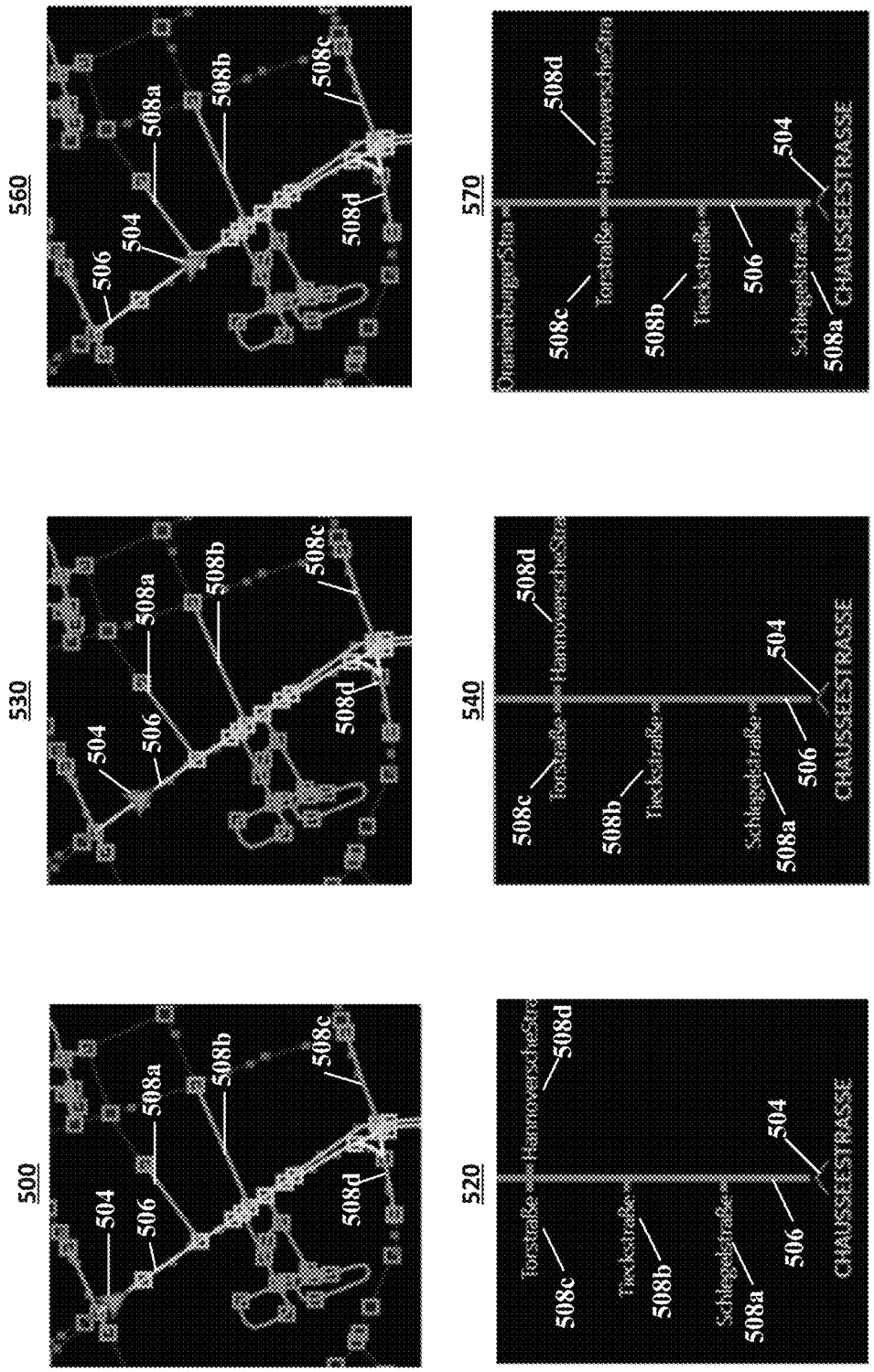
FIGS. 5A, 5B, and 5C illustrate example screenshots of the first navigation interface display that updates as the user walks through a city in accordance with various embodiments.

FIGS. 5A, 5B, and 5C illustrate example screenshots 500, 530, and 550 of the 'fishbone view' navigation interface display that updates as the user of the mobile device walks through a city. Screenshots 520, 540, and 560 are shown next to their electronic horizon data counterparts 500, 530, and 560 for ease of illustration. The electronic horizon data as superimposed onto a road map may not be displayed along with the 'fishbone view' navigation interface on the mobile device screen, but is shown here for ease of understanding. Screenshot 520 is a snapshot of the navigation interface as the pedestrian user of the mobile device at a first time. Screenshot 540 is a snapshot of the navigation interface at a second time, which occurs after the first time, when the pedestrian user has moved along on the current path 506 than the position that he was located on at the first time. Screenshot 570 is a snapshot of the navigation interface at a third time, which occurs after the first and the second time, when the pedestrian user has moved even further along on the current path 506 than the second time.

As the mobile device moves, the current location 504 may be updated and the display of the navigation interface may also be updated. As the navigation interface updates to reflect the movement of the mobile device, the elements displayed in the navigation interface may shift as the mobile device moves further along on the current path 506. New upcoming intersections may be displayed in the navigation interface and old intersections that the mobile device has already crossed during its movement may be removed from display on the navigation interface.

In the embodiment shown in FIGS. 5A, 5B, and 5C, the navigation interface may be updated as the current location is updated. From the point of view of the pedestrian user of the mobile device located at current location 504, the electronic horizon information may identify that potential path 508a is the first upcoming intersection with current path 506 and that potential path 508a presents a potential diversion to the current path 506 on the left side of the current path 506 from the point of view of the pedestrian user. Accordingly, a tick 508a may be marked a predetermined amount of distance from the current location marker 504 on the navigation interface. The name of the road may be identified from the extracted road data and may be displayed next to the tick 508a on the navigation interface on the left side of the vertical line 506. Similarly, another determination may be made from the electronic horizon data that a path 508b forms a second intersection with current path 506 on the left after potential path 508a. Accordingly, a tick 508b may be marked a predetermined amount of distance from the tick 508a on the navigation interface and the name of the road for potential path 508b may be displayed next to the tick 508b on the navigation interface on the left side of vertical line 506. Similarly, another determination may be made from the electronic horizon data that a potential path 508c forms a second intersection with current path 506 on the left after potential path 508b and that potential path 508d forms an intersection with current path 506 on the right side at the same location as potential path 508c. Accordingly, a tick 508c may be marked a predetermined amount of distance from the tick 508b on the navigation interface and the name of the road for potential path 508b may be displayed next to the tick 508b on the navigation interface on the left side of vertical line 506. Similarly, a tick 508*d* may be marked a predetermined amount of distance from the tick 508*b* at the same point as tick 508*c* on the navigation interface and the name of the road for potential path 508*b* may be displayed next to the tick 508*d* on the navigation interface on the right side of vertical line 506.

In the embodiment shown in FIGS. 5A, 5B, and 5C, the elements displayed in the navigation interface may shift at different rates as the mobile device moves between different intersections. The navigation interface may be moved down by a percentage of the total distance to the next intersection as the current location of the mobile device moves down the current path 506. For example, the actual distance between potential paths 508*a* and 508*b* may be determined to be less than the distance between potential path 508*b* and potential paths 508*c* and 508*d*. The navigation interface may have spaced the corresponding tick marks for potential path 508*a* and 508*b* an equal distance as the spacing between the ticks marks for potential path 508*b* and potential paths 508*c* and 508*d*. As the pedestrian user moves along the current path 506 in keeping with his identified bearing, the navigation interface may be updated by moving the map down by a percentage of distance that is actually traveled by the pedestrian user between the intersections. Accordingly, the map displayed by the navigation interface may move down a greater percentage when the pedestrian user walks a fixed distance between the first intersection formed by potential path 508*a* and current path 506 to the second intersection formed by potential path 508*b* and current path 506 than when the pedestrian user moves the same fixed distance between the second intersection formed by potential path 508*b* and current path 506 to the third intersection formed by potential path 508*c* and current path 506. Such a difference in the rate at which the navigation interface is shifted downwards may occur to reflect that the actual distance between the first intersection and the second intersection is less than the actual distance between the second intersection and the third intersection.

In some embodiments, landmarks and POIs may be identified from the extracted road data and may be plotted on the navigation interface. For example, POIs such as restaurants, banks, parks, shopping centers etc., may be identified from the extracted road data or any other source and their location may be identified. Such POIs may be incorporated into the electronic horizon to determine their location relative to the paths in the vicinity of the pedestrian user's current location. A tick for each POI may be displayed on the navigation interface. The mobile device may display POIs on the navigation interface in a context sensitive manner. For example, the time of day and preference of the pedestrian user may be taken into account in determining which POI(s) to display on the navigation interface. If the mobile device identifies that the user is a vegetarian, then only vegetarian restaurants may be displayed. If the time of day is between 11 AM-2 PM, vegetarian food restaurants that are currently open for lunch may be displayed as POIs on the navigation interface. The user may also be offered the ability to filter out POIs based on different filter categories.

In some embodiments, the navigation interface may provide the user with the ability to 'pull up' or 'pull down' the navigation interface to view road data that is not displayed on the screen. For example, even if the user's current location has not changed, the user may have the ability to manually alter the navigation display by pulling up or pulling down the navigation interface displayed on a touch screen of the mobile device. In response to such a pull up or pull down command, additional potential paths and POIs beyond the range of what is displayed on the mobile device screen may be rendered for display.

Figure 6C:
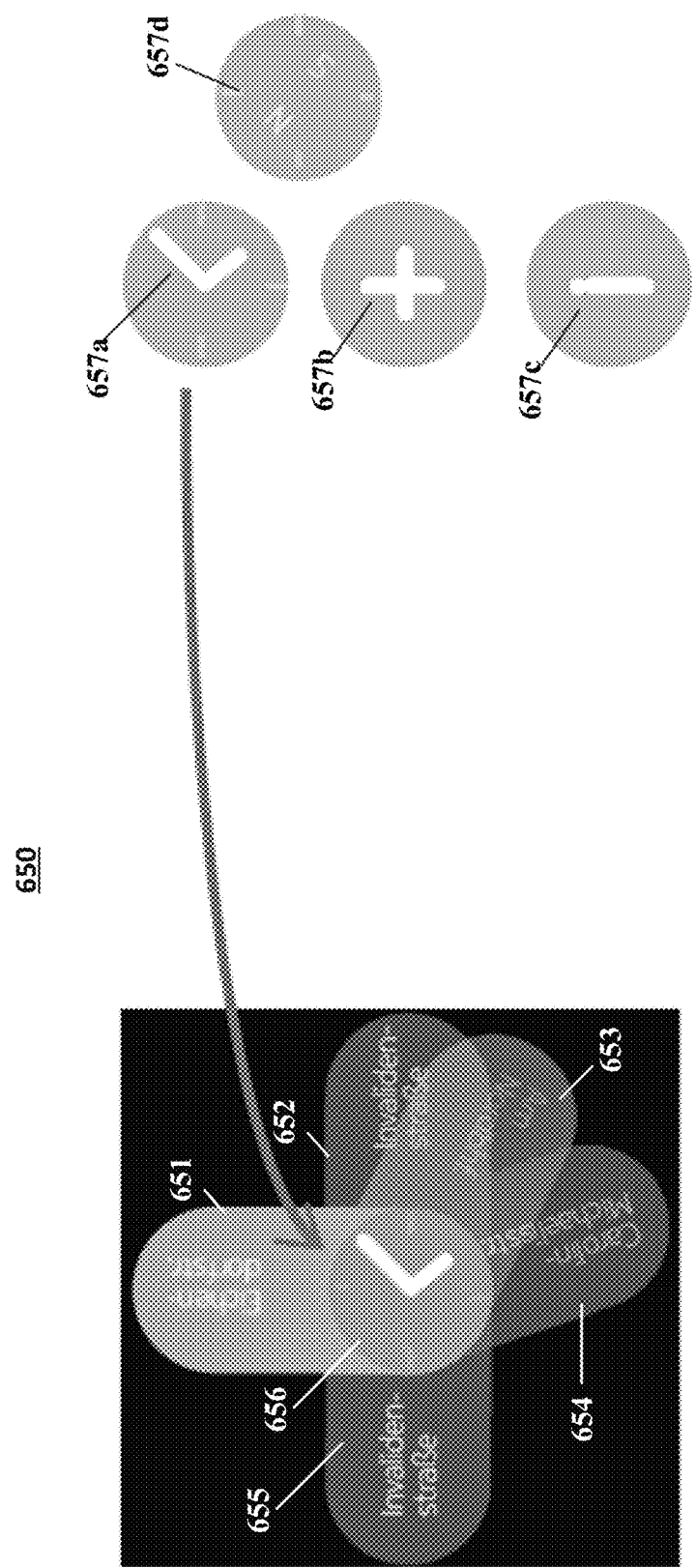
Figure 6D:
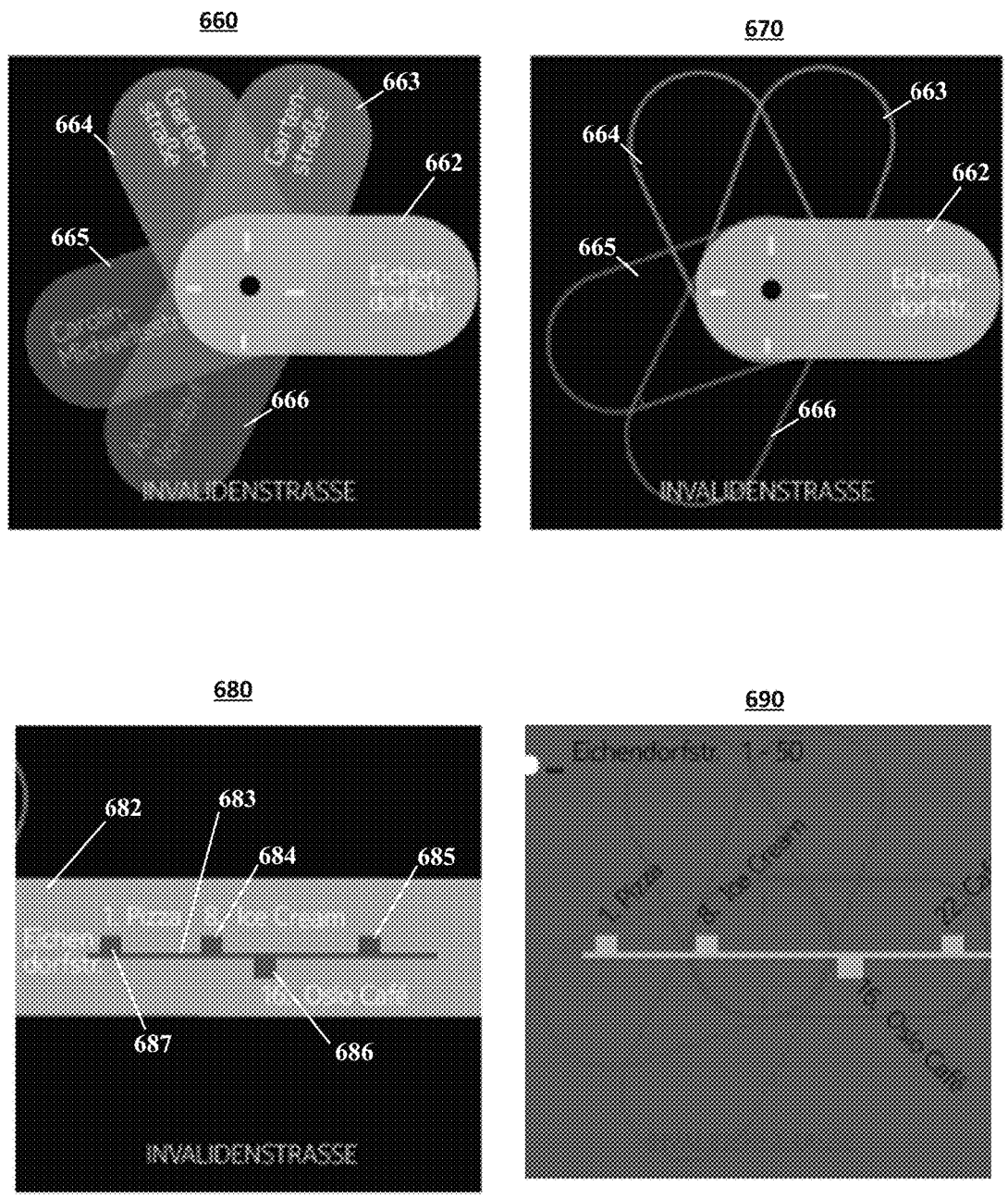

FIG. 6A illustrates an example rendering of an electronic horizon 600 that is used to generate the second navigation interface illustrated in FIGS. 6B, 6C, and 6D. FIG. 6B illustrates an example embodiment of the second navigation interface 630, hereinafter also referred to as a 'flower view' navigation interface. FIGS. 6C and 6D illustrate example embodiments of navigation interfaces that may be present in the second navigation interface and/or may be used in any other navigation interfaces.

By using the electronic horizon data 600 illustrated in FIG. 6A, a mobile device may generate a 'flower view' navigation interface 630 as shown in FIG. 6B for display on the mobile device. Such 'flower view' navigation interface 630 shows relative directions of upcoming potential paths from the perspective of the current location of the pedestrian user. Labels 632, 634, 636, and 638 in the navigation interface 630 may correspond to potential paths 610, 616, 624, and 630 in electronic horizon 600, respectively. Each label may include a name of the path to which it corresponds. The name of the path may be identified from the extracted road data or any map data source. Each label may be oriented around a common point of the navigation interface display 630 in a direction that corresponds to the relative direction of the corresponding path from the current location 604 in the electronic horizon 600. As described throughout this disclosure, a common point of a navigation interface may refer to a point in the navigation interface from which all the relative direction vectors originate and around which labels may be oriented. The opacity of labels displayed in the navigation interface 630 may vary based on the distance of the potential path corresponding to the label from the current location of the pedestrian user of the mobile device.

In some embodiments, the electronic horizon 600 may be generated once it is determined that a 'flower view' navigation interface is to be displayed on the mobile device. To generate the electronic horizon 600, the current location 604 and the current path 606 on which the mobile device is located may be identified. The nearest intersections between upcoming potential paths in the vicinity of the current location 604 and the current path 606 may be identified. For example, potential paths 610, 616, 624, and 630 may be identified to be the nearest potential paths intersecting the current path 606. For each such identified path, a direction vector of the path may be determined. The direction vector may be calculated from the point at which the identified path intersects the current path 606 to a node further down the identified path, hereinafter also referred to as a shape point. Such a shape point may be a point where the road for the intersecting path changes direction. Additionally or alternatively, such a shape point may be a data point in the road captured by the electronic horizon data past the intersection in a given direction. A point may be projected a predetermined amount of distance along this determined direction vector from the intersection for each identified path. For example, point 612 may be projected down a fixed distance from the point at which potential path 610 intersects with current path 606 along the direction vector of potential path 610. Such a fixed or predetermined distance from the intersection to the projected point on the identified path may be determined based on the density of objects (e.g., upcoming potential paths and/or POIs) in the vicinity of the current path. Additionally or alternatively, the predetermined distance may also be determined based on how much area is considered to search for upcoming objects near the current location of the mobile device. The value of the predetermined distance from the intersection to the projected point may determine the speed at which the labels rotate about an axis of the navigation interface perpendicular to the navigation interface.

Similarly, point 618 may be projected down a fixed distance from the point at which potential path 616 intersects with current path 606 along the direction vector of potential path 616. Next a second direction vector, hereinafter also referred to as the relative direction vector, may be calculated from the current location 604 of the user to the projected points for each identified path that intersects the current path 606. For example, relative direction vector 614 may be calculated by connecting the current location 604 to projected point 612 for path 610. Similarly, relative direction vector 620 may be calculated by connecting the current location 604 to projected point 618 for potential path 616. The relative direction vectors for each intersecting path may be used to determine the direction of orientation for the corresponding labels to these intersecting paths in the navigation interface 630. For example, label 632 may be oriented along the direction of corresponding relative direction vector 614 for the corresponding potential path 610. Similarly, label 634 may be oriented along the direction of corresponding relative direction vector 620 for the corresponding potential path 616.

In some embodiments, the label arrangement of the navigation interface 630 may be oriented with the user's bearing to be up. As the user walks along the current path 606, the current location 604 may be updated which in turn may result in the relative direction vectors for each upcoming potential path to be updated. Accordingly, the orientation of each label in the arrangement of navigation interface 630 may be updated as the user walks along the current path 606. This may result in a flower like effect while the user moves through the current path 606 as the labels, e.g. flower petals, for each upcoming potential path blossom, fold down, and eventually are removed from display. For example, as the location of the user changes, (e.g., as the user walks), each label may rotate downward (toward the bottom of the display) about an axis that is perpendicular to the display and that passes through the common point. This may occur as the relative direction vector for each upcoming object changes as the current location changes. Since the labels are oriented in a direction of their respective relative direction vectors, a change in the relative direction vectors also changes their orientation about the axis perpendicular to the display, resulting in the label rotating downward and eventually being removed from display as the corresponding path is no longer in the vicinity of the current location of the mobile device. In some embodiments, this removal may occur, e.g., when a label is oriented directly down, or shortly after reaching such an orientation.

The distance from the user's current location 604 to the upcoming potential path, and/or to the projected point, may determine the drawing order and transparency of the corresponding label in the navigation interface 630. For example, the labels corresponding to the closest potential paths to the current location 604 may be drawn on top and may be displayed with the most relative opacity of all the labels displayed on the navigation interface 630. Additionally or alternatively, the distances from the user's current location 604 to the projected points 612 and 618 may be used to determine respective relative movements of the labels 632 and 632 when the current location 604 changes. For example, the more distant the projected point is from the current location, the slower the respective label may rotate about its axis (e.g., the vertical line perpendicular to a display surface in the position of the current location). Additionally, the less distant the projected point may be from the current location, the more or faster the respective label may rotate about its axis when the current location changes.

In some embodiments, the labels corresponding to potential paths that are further away from the current location 604 of the user than nearby upcoming potential paths may be blurred to increase legibility of text corresponding to the nearby upcoming potential paths. Additionally, or alternatively, the labels for potential paths that are further away from the current location 604 may be displayed with greater transparency than the labels for potential paths that closer to the current location 604 of the pedestrian user.

In some embodiments, potential paths that have the same name and are located on both the right and left sides of the current path 606 may have their corresponding labels be colored with the same color on the navigation interface 630 to indicate that both of left side and right side paths are the same potential path intersecting with the current path 606.

FIG. 6C illustrates an example embodiment of a navigation interface 650 that may correspond to the flower view navigation interface. The labels 651, 652, 653, 654, and 655 of the navigation interface 650 are labels that correspond to potential nearby paths in a similar manner to that described in connection with the flower navigation interface 630 described in FIG. 6B. Various interactive display elements such as elements 657a, 657b, 657c, and 657d may be displayed at a common point 656 of the navigation interface 650 at which the different labels 651, 652, 653, 654, and 655 intersect. The common point 656 may be an area of the navigation interface 650 at which one end of each of the labels 651, 652, 653, 654, and 655 may meet. The common point 656 may also be an area of the navigation interface 650 around which the different labels 651, 652, 653, 654, and 655 are oriented. The interactive elements 657a, 657b, 657c, and 657d may be selected by the user of the navigation interface 650 to interact with the navigation interface 650 itself. For example, if the user selects element 657b (e.g., by touching an area of the mobile device screen on which element 657b is displayed), the navigation interface 650 may be zoomed in (e.g., the zoom level of the navigation interface 650 may be increased). Similarly, if the user selects element 657c, the navigation interface 650 may be zoomed out (e.g., the zoom level of the navigation interface 650 may be decreased). Some elements that may be displayed may show other aspects of a navigation interface. For example, element 657d may display a compass on the common point 656. Other elements that may be displayed in the common point 656 may be visual renderings of other applications of the mobile device that are not related to the navigation interface such as a clock display. For example, element 657a may display the current time at common point 656 by displaying an analog or digital clock display. In alternative embodiments, elements 657a, 657b, 657c, and 657d may be displayed in a common point of various other navigation interfaces at which the labels for potential paths intersect.

FIG. 6D illustrates screenshots 660, 670, 680, and 690 of a navigation interface that may correspond to the flower view navigation interface or may correspond to similar navigation interfaces. Screenshots 660 and 670 illustrate that the navigation interface may highlight specific labels when the navigation interface is displayed to provide turn by turn directions. For example, when the navigation interface has been configured to provide the user with directions from a start point to a destination, different labels of the navigation interface 660 may be highlighted to indicate the next potential path that the user needs to turn on. For example, the navigation interface 660 may highlight label 662 by determining that the path corresponding to label 662 represents the next potential path on which the user needs to turn according to the turn by turn instructions. As screenshot 670 shows, labels 663, 663, 664, 665, and 666 may be displayed as transparent labels or may only have their outlines displayed while label 662 for the next path on which the user needs to turn may be highlighted.

In some embodiments, the user may be able to select a label from the navigation interface and see points of interest that may be located along the potential path corresponding to the selected label that is out of range of the display presented in the navigation interface. For example, when the user selects label 662 and indicates that he desires to see further down the corresponding path of label 662 (e.g., by selecting label 662 and swiping to the right), screenshot 680 may be displayed. Screenshot 680 shows an example display screen in which the navigation interface displays elongated label 682 that corresponds to the label 662 that was out of the viewing range of the screen displayed in screenshots 660 and 670. The navigation interface, in this case, may display the various POIs 683, 684, 685, 686, and 687 that are located on or adjacent to the path corresponding to elongated label 682. In some embodiments, the user may be able to display the elongated label 682 and the various nearby POIs shown in screenshot 680 in full screen mode, as shown in screenshot 690. As illustrated in screenshot 690, the entire display screen of the navigation interface showing the various labels 662, 663, 663, 664, 665, and 666 of the navigation interface may be displayed in the background with an overlay of a full screen display of the elongated label 682 and the various POIs found on the path corresponding to elongated label 682 displayed in the foreground.

FIG. 7A illustrates an example rendering of an electronic horizon 700 that is used to generate the second navigation interface 700 displaying POIs illustrated in FIG. 7B. FIG. 7B illustrates an example embodiment of the second navigation interface 750 displaying multiple POIs.

According to the embodiment illustrated in FIGS. 7A and 7B, one or more points of interest 708 and 710 amongst many others may be identified. Such POIs and their locations may be identified from various different sources. POIs that are located within a predetermined distance of the current location 704 of the user and match any enabled filter criteria may be mapped onto the electronic horizon 700 that displays nearby potential paths intersecting with the current path 706 as discussed above in FIG. 6A. For example, POI 708 for a bank named 'Pax Bank' may be identified as being located in the vicinity of current location 704. Once the location of the POI is identified, a first direction vector of the POI may be calculated along the current path 706. The first direction vector may be calculated by forming a vector from the location of the POI to the nearest point of the current path 706. A point may be projected within a fixed distance of the nearest point on the current path 706 on the first direction vector. A second direction vector, hereinafter also referred to as the relative direction vector, may be determined by connecting the projected point for the POI to the current location 704 of the user. The relative direction vectors for each POI may be used to determine the direction of orientation for the corresponding labels to these POIs in the navigation interface 750. For example, label 758 may be oriented along the direction of the relative direction vector for the corresponding potential path 708. Similarly, label 760 may be oriented along the direction of the relative direction vector for the corresponding POI 710. In another example embodiment, the one or more POIs may be located on the current path 706. In such an example embodiment, the system may create a virtual direction vector for a respective POI that is drawn perpendicularly to the current path 706 at the location of the respective POI on the current path. A point may be projected within a predetermined distance from the current path on the virtual direction vector. The relative direction vector may be determined by connecting the projected point to the current location 704 of the user.

In some embodiments, the navigation interface 750 may comprise labels for only POIs. For example, upon receiving a user selection to view all the POIs near the current location of the user, the navigation interface 750 may be displayed including labels for only POIs. In other embodiments, the navigation interface 750 may include labels for nearby potential paths as well as nearby POIs to the current location of the user. The user may be provided with the option of filtering POIs displayed on the navigation interface 750 according to different categories of POIs. There may be a preset maximum number of POI labels allowed to be displayed on the navigation interface 750.

Figure 8:
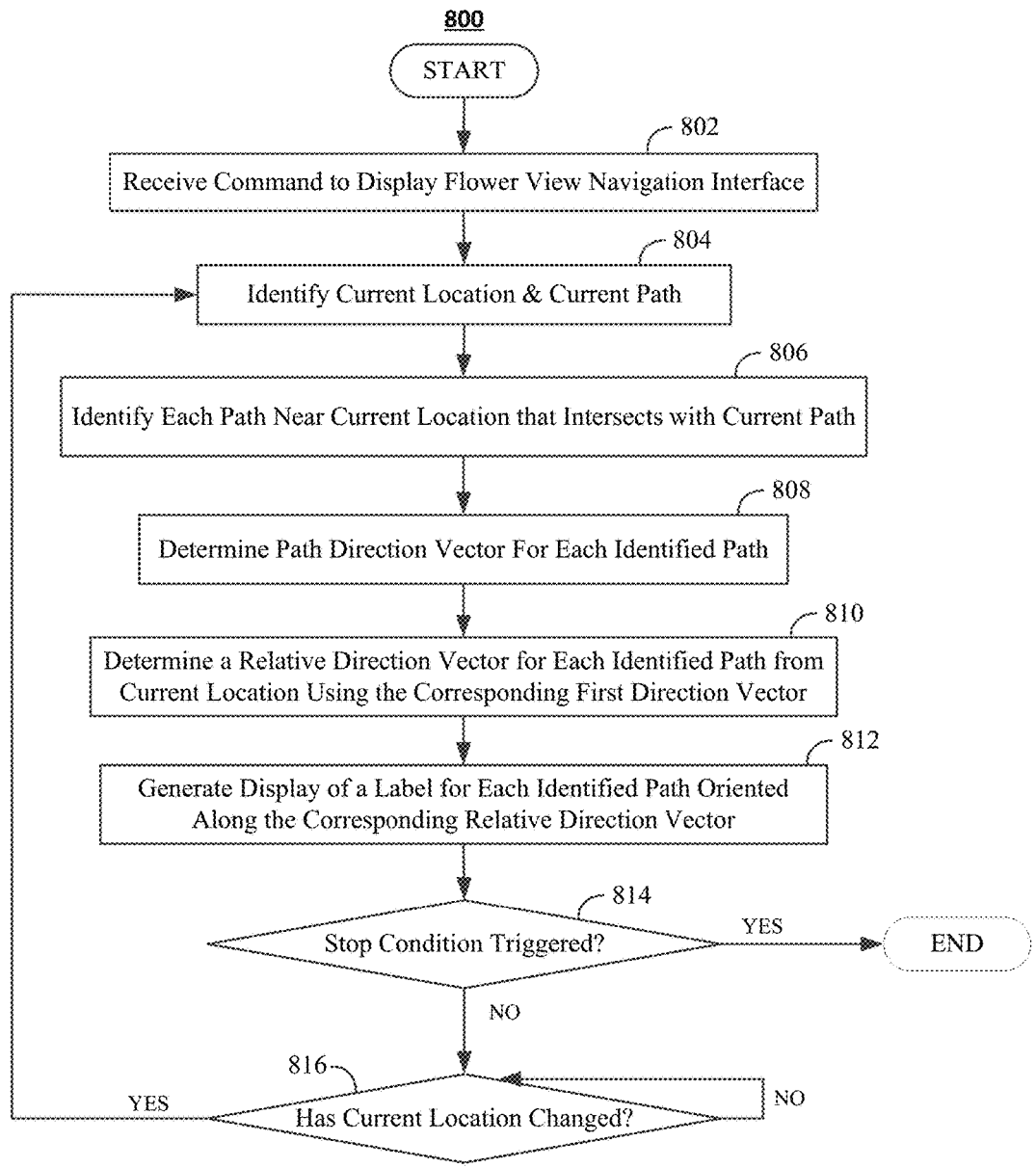
FIG. 8 illustrates an example process flow diagram for generating the second navigation user interface in accordance with various embodiments.

FIG. 8 illustrates an example process flow diagram for generating the second navigation user interface. The example method 800 of FIG. 8 may be performed by the mobile device 102 of FIG. 1.

At step 802, a command may be received to display the flower view navigation interface. Such a command may be received by the mobile device if the user requests display of the flower view navigation interface. Additionally or alternatively, such a command may be received if the mobile device determines that the user has toggled an option to display the flower view interface amongst different navigation interface options.

At step 804, the mobile device may identify the current location and current path on which the mobile device is located. The mobile device may identify its current location using several different techniques described above in FIG. 1. For example, the mobile device may include a GPS communication circuit that communicates with satellites directly or indirectly through other computing devices to obtain the position of the mobile device. Additionally or alternatively, the mobile device may obtain its location by detecting signals from nearby wireless access points and determining signal strength from such access points. By using the determined signal strength of each wireless access point, the mobile device may be able to determine distance from each wireless access point to pinpoint the location of the mobile device. The mobile device may also be able to identify its own bearing using an on-board compass. By identifying its current location, the mobile device may be able to extract the current path on which the mobile device is located by correlating the current location with road information extracted from road data or map data databases, and/or by comparing current and previous position data. Identifying the current location in step 804 may also comprise, for performances of step 804 after a location change determination has initially occurred (e.g., as the method loops back to step 804 from step 816, as described below), selecting a new location that was determined as part of determining a location change.

At step 806, the mobile device may identify each potential path near the current location that intersects with the current path. The mobile device may identify, from the extracted road data and an electronic horizon, which paths intersect the current path within a predetermined distance of the current location of the mobile device. For example, the mobile device may only determine at a time all the potential paths within 300 meters of the current location of the mobile device that intersect the current path.

At step 808, the mobile device may determine a path direction vector for each of the identified potential paths that intersect the current path. For each potential path identified in step 806, the mobile device may calculate a path direction vector. Such a path direction vector maybe calculated by connecting the point at which the corresponding identified path intersects with the current path to a next shape point or node in the identified potential path. Such a shape point and/or node may be identified from the extracted map data defining points along the identified path. The resulting path direction vector may be used to form the direction of the identified path. Such a first direction vector may not be subject to change as the current location of the mobile device changes. In some embodiments, the path direction vector may only be calculated once for each potential path regardless of the number of times that the current location changes as the pedestrian user is walking. In an another embodiment, the path direction vector may be determined to follow and/or replicate a general direction and location coordinates of the respective potential path, and to intersect the current path in a location that matches with respective points of the path direction vector and the current path.

At step 810, the mobile device may determine a relative direction vector for each of the identified potential paths from the current location using the path direction vector. Using the current location of the mobile device, the mobile device may calculate a projected point along the path direction vector of the identified path. The projected point may be a point on the first direction vector at a predetermined distance from where the identified path intersects the current path. In some embodiments, the predetermined distance is 75 meters; in other embodiments the predetermined distance may have another value. The mobile device may calculate relative direction vectors for each identified potential path by connecting the current location of the mobile device with the projected point for the corresponding potential path. Each relative direction vector may indicate a relative direction of the corresponding identified path as seen from the perspective of the current location of the mobile device and may change as the current location of the mobile device changes. In an example embodiment, the distance of the projected point from the intersection of the current path and the identified potential path may be determined based on the density with which potential paths are arranged on the navigation interface displayed on the mobile device. For example, the more dense the road network, the shorter the projected point distance from the intersection, and vice versa. The projected point distance may be adjusted by the mobile device based on predetermined threshold values of road network density, or manually by a user of the mobile device to ensure desired user experience.

At step 812, the mobile device may generate display of a label for each of the identified potential paths oriented along a direction of the relative direction vector. The mobile device may generate a label including the name of the identified path for each identified potential path on the navigation interface. One end of each label may be connected to a common point of the navigation interface. The label may be positioned such that the label is oriented along a direction of the relative direction vector for the corresponding path as identified in step 810. The opacity and blurriness level of each label may be determined based on the distance between the corresponding path of the label and the current location of the mobile device. A label may be generated for each different identified path, resulting in multiple different labels having one end attached to the common point of the navigation interface. The different labels may be oriented along their corresponding relative direction vectors.

At step 814, the mobile device may determine whether a stop condition has been triggered. For example, the mobile device may determine whether the user has indicated that they wish to stop displaying the navigation interface. The mobile device may monitor whether it has received instructions from the user to close the navigation interface, to display a different navigation interface, to turn off or minimize a mobile application that displays the navigation interface, and/or turn off the mobile device. Each of these instructions from the user may trigger a stop condition indicating the mobile device to terminate method 800 and stop performing computations related to the navigation interface and/or to stop display the navigation interface. If such a stop condition has not been triggered, the method may proceed to step 816 to determine whether the current location of the mobile device has changed.

At step 816, the mobile device may determine whether the current location has changed. By monitoring the current location of the mobile device, the mobile device may determine at a later time whether the current location has changed. Such a determination may be made periodically or in response to an indication received from an inertial sensor of the mobile device indicating movement of the mobile device. If the mobile device determines that the current location of the mobile device has not changed, and as indicated by the "no" branch from step 816, the mobile device may periodically perform such a determination until it determines that the current location has changed.

In response to determining that the current location has changed, the method 800 may return to step 804 to determine the updated current location of the mobile device. The mobile device may identify the new location using the techniques described in FIG. 1 and previously in connection with step 804. Steps 806 to 812 are then repeated in the iteration of step 806, for example, the mobile device may identify new potential paths that intersect the updated current path (if the current path has changed along with the location, or if additional potential paths have come into range) within the predetermined distance of the updated current location. Labels for potential paths that are no longer within the predetermined distance of the updated current location may be removed from the display in the navigation interface. In the iteration of step 810, the mobile device may determine an updated relative direction vector for each identified path. The updated relative direction vectors may be calculated by connecting the updated current location of the mobile device with a projected point located on the corresponding path direction vectors at a predetermined distance from where each identified path intersects the current path. The updated relative direction vector may differ from the previously calculated relative direction vector for the identified path. Such a change may reflect the change in perceived direction from the user's new location to the identified path as the current location is updated. In the iteration of step 812, the mobile device may update display of each label for the corresponding identified path. For example, the mobile device may update the orientation of the displayed label in the navigation interface corresponding to the identified path. The orientation of the label may be updated such that the label is oriented along a direction of the corresponding updated relative direction vector. The opacity and blurriness level for each given label may be recalculated based on the distance between the corresponding potential path of the label and the updated current location of the mobile device. Additional iterations of steps 804-812 may occur after each position change of the mobile device, in a manner described above, until a stop condition is reached.

Although the method 800 identifies current paths, it may also, or alternatively, identify POIs near the current location and generate labels for them in the same manner as that for potential paths as described above in method 800.

FIGS. 9A, 9B, and 9C illustrate example screenshots of the second navigation interface display that updates as the user walks through a city.

FIGS. 9A, 9B, and 9C illustrate example screenshots 910, 930, and 950 of the 'flower view' navigation interface display that updates as the user of the mobile device walks through a city. Screenshots 910, 930, and 950 are coupled with their electronic horizon data counterparts 900, 920, and 940, respectively for ease of illustration. The electronic horizon data as superimposed onto a road map may not be displayed along with the 'flower view' navigation interface on the mobile device screen, but is shown here for ease of understanding. Screenshot 910 is a snapshot of the navigation interface as the pedestrian user of the mobile device opens the navigation interface for display on the mobile device at a first time. Screenshot 930 is a snapshot of the navigation interface at a second time, which occurs after the first time, when the pedestrian user has moved along on the current path 906 than the position that he was located on at the first time. Screenshot 950 is a snapshot of the navigation interface at a third time, which occurs after the first and the second time, when the pedestrian user has moved even further along on the current path 906 than the second time.

As the mobile device moves, the current location 904 may be updated and the display of the navigation interface may also be updated. As the navigation interface updates to reflect the movement of the mobile device, the labels for each upcoming potential path displayed in the navigation interface may change their relative orientations as the mobile device moves further along on the path 906 and the relative direction to the upcoming potential path changes from the perspective of the pedestrian user. New upcoming intersections may be displayed and old intersections that the mobile device has already crossed during its movement may be removed from display on the navigation interface as currently displayed labels for nearby intersections change their relative orientations on the navigation interface.

In the embodiment shown in FIGS. 9A, 9B, and 9C, the navigation interface may be updated as the current location is updated. At an initial time, as shown in FIG. 9A, the mobile device may use electronic horizon information 900 to identify that potential paths 908a, 908b, 908c, and 908d intersect the current path 906 within a predetermined distance of the current location 904. Accordingly, the mobile device may calculate relative direction vectors 911, 912, 914, and 916 from the current location 906 to potential paths 908a, 908b, 908c, and 908d, respectively. The mobile device may generate labels 932, 934, 936, and 938 on the navigation interface display 910 for the potential paths 908a, 908b, 908c, and 908d, respectively. The labels 932, 934, 936, and 938 may each be oriented according to the relative direction vectors 911, 912, 914, and 916, respectively.

FIG. 9B shows that at a second time after the first time when the user's current location has changed, the relative direction vectors 911, 912, 914, and 916 have been updated. As the current location 904 is updated at a second time shown in FIG. 9B upon the user movement from the initial location shown in FIG. 9A, the relative direction vectors 911, 912, 914, and 916 may be recalculated using the updated current location 904 as shown in the electronic horizon 920. Accordingly, the orientation of labels 932, 934, 936, and 938 may be updated in the navigation interface 930 according to the corresponding updated relative direction vectors 911, 912, 914, and 916, respectively.

FIG. 9C shows that at a third time after the second time shown by FIG. 9B, the user's current location 904 has changed from its previous position in electronic horizon 920. For example, the user's current location 904 in electronic horizon has moved further along the current path 906 in electronic horizon 940 than in electronic horizon 920. As the current location 904 is updated once again, a determination may be made that different potential paths are now within the predetermined distance from the current location 904. For example, it may be determined that potential paths 908a and 908b are too far away from the updated current location 904 to be displayed in the navigation interface 950. Accordingly, labels 932 and 934 corresponding to potential paths 908a and 908b may be removed from the navigation interface 950. It may be further determined that new upcoming paths intersect the current path 906 within the predetermined distance of the current location 904. For example, it may be determined that potential path 908e intersects the current path 906 within a predetermined distance of the updated current location 904. Accordingly, the relative direction vector 918 may be calculated for the potential path 908e. It may be determined that potential paths 908c and 908d are still within the predetermined distance of the updated current location. Accordingly, their corresponding relative direction vectors 914 and 916 may be updated based on the updated current location 904. Label 942 corresponding to potential path 908e may be introduced to the navigation interface 950. The orientation of label 942 may be based on its corresponding relative direction vector 918. The orientation of labels 936 and 938 may be updated in the navigation interface 950 according to the corresponding updated relative direction vectors 914, and 916, respectively. The opacity and blurriness levels of labels 936 and 938 may be adjusted based on the distance between the updated current location 904 and the potential paths 908c and 908d.

In some embodiments, by fixing a nonzero predetermined distance to project a point along the first direction vector for the calculation of the relative direction vector, the labels of the navigation interface are displayed with varying directions. For example, as the predetermined distance from the intersection that is used to select a projected point along the first direction vector approaches zero, the relative direction vectors for different potential paths ahead of the current location may all have angles approaching 90 degrees and all relative direction vectors for potential paths behind the current vector may all angles approaching 270 degrees. Accordingly, with a nonzero direction vector (around 75 meters for example), relative direction vectors for different potential paths may have different direction vectors with varying angles. Accordingly, the labels in the navigation interface may have variety in their directions to provide the user with a discernible sense of the relative direction of the different potential paths. Such a predetermined distance used to project a point for calculation of the relative direction vectors may be varied based on the functional class of the paths encountered or other map characteristics that represent the separation of roads.

Figure 10A:
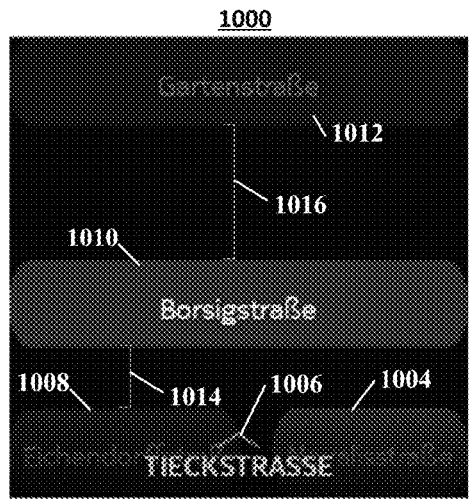
FIGS. 10B, 10C, and 10D illustrate example processes used to generate the third navigation interface display illustrated in FIG. 10A in accordance with various embodiments.
Figure 10B:
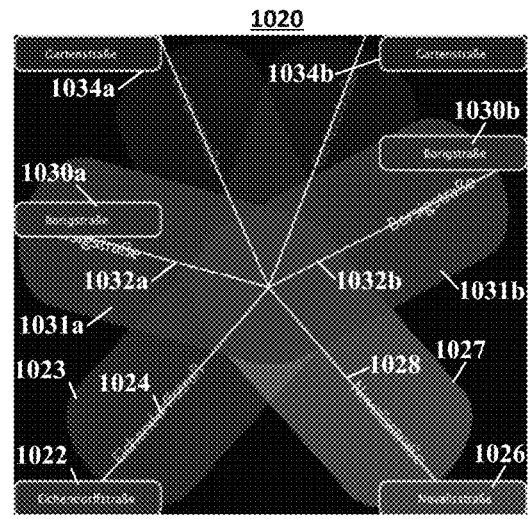
Figure 10C:
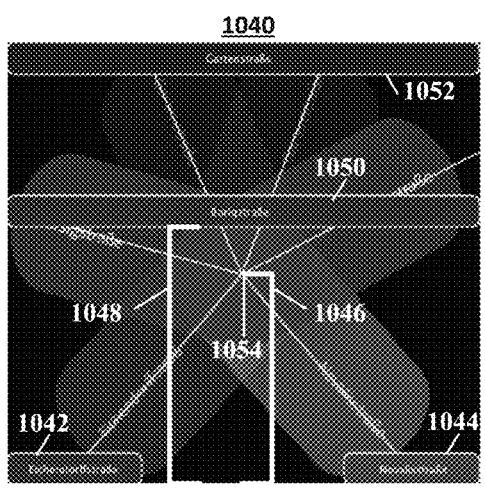
Figure 10D:
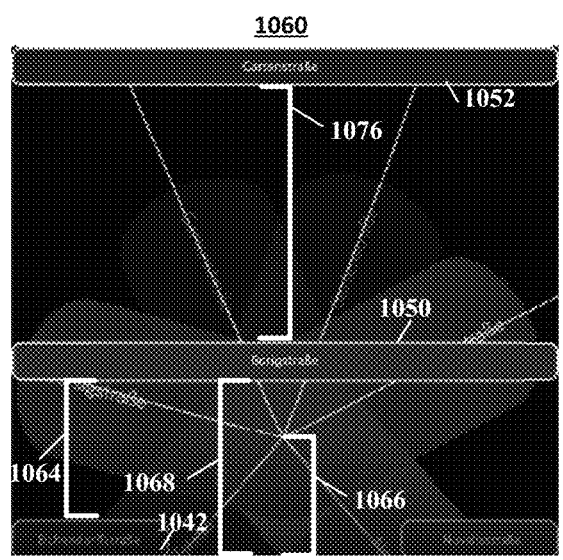

FIGS. 10A, 10B, 10C, and 10D illustrate the generation of a third navigation interface 1000. In particular, FIGS. 10B, 10C, and 10D show exemplary illustrations 1020, 1040, and 1060 of a process used to generate the third navigation interface 1000, hereinafter also referred to as a 'radar view' navigation interface, illustrated in FIG. 10A.

The radar view navigation interface 1000 may be a hybrid of the fishbone view navigation interface as shown in FIGS. 3B and 4B and the flower view navigation interface as shown in FIGS. 6B and 7B. For example, the radar view navigation interface 1000 may include horizontal labels 1004, 1008, 1010, and 1012 for potential paths similar to the fishbone view navigation interface. However, instead of fixing the spacing in between different potential paths intersecting the current path 1006 as the fishbone view navigation interface does, the spacing in between different path labels may be variable in the radar view navigation interface 1000. For example, spacing 1014 between adjacent labels 1008 and 1010 may be smaller than spacing 1016 between adjacent labels 1010 and 1012. The radar view navigation interface uses the relative direction vector used by the flower view navigation interface to determine the vertical location in the navigation interface screen to display a label for an upcoming potential path that intersects the current path 1006. Placing labels horizontally may increase the legibility of the labels and basing the vertical placement location on the relative direction of the corresponding upcoming potential paths instead of a fixed space may provide the user with more context for the immediacy of the upcoming potential path. The spacing between labels for upcoming objects and an indicator for the current path 1006 may be based on a vertical distance component of the relative direction vector for the corresponding object. Additionally or alternatively, the spacing may be proportional to the actual distance between the object and the current location of the mobile device. Additionally or alternatively, the proportional spacing between an upcoming object and the current path, as displayed on the navigation interface 1000, may be capped or floored at predefined maximum and minimum values.

To generate the radar view navigation interface 1000 illustrated in FIG. 10A, the current location and current path 1006 may be determined for the mobile device. Then electronic horizon data may be analyzed to determine the nearest upcoming potential paths that intersect the current path 1006 within a predetermined distance of the current location. Once the relevant upcoming potential paths are identified, the mobile device may determine the direction vector of each upcoming potential path from the point at which the potential paths intersect with the current path 1006 to the next shape point in the upcoming potential path. The mobile device may project a point a fixed distance from the intersection point along the determined direction vector of the upcoming potential path. The mobile device may calculate a relative direction vector for each upcoming road from the electronic horizon data by connecting the current location of the mobile device with the projected point for each upcoming potential path. Exemplary illustration 1020 of FIG. 10B shows that the mobile device may project the relative direction vectors 1024, 1028, 1032a, and 1032b for upcoming potential paths 1023, 1027, 1031a, and 1031b, respectively. Such relative direction vectors 1024, 1028, 1032a, and 1032b may not be displayed on the navigation interface 1000 but may be used for intermediate calculation of how to display the navigation interface 1000. The mobile device may calculate a vertical placement location or the vertical length of these direction vectors 1024, 1028, 1032a, and 1032b to determine the placement location of corresponding labels 1022, 1026, 1030a, and 1030b, respectively. For example, the mobile device may determine that label 1030a is to be placed at given vertical location in the navigation interface by determining the vertical location of the display screen at which corresponding relative direction vector 1032a terminates. For example, by determining that relative direction vector 1032a, when originating from a common point on the display screen, would terminate at a first vertical location of the display screen by touching the border of the display screen at that first vertical location, the mobile device may determine the vertical distance component of the relative direction vector 1032a. The mobile device may determine that label 1030a is to be placed at the determined first vertical location.

In some embodiments, as shown by exemplary illustration 1040 of FIG. 10C, labels with the same path name may be grouped. For example, in exemplary illustration 1020 of FIG. 10B, labels 1030a and label 1030b may be labels corresponding to potential paths that intersect the current path 1006 on the left side and the right side of the path. The mobile device may determine different vertical display locations on the navigation interface for both labels 1030a and 1030b because their corresponding relative direction vectors 1032a and 1032b may have different vertical length components. Vertical length components for relative direction vectors of two different sides of the same potential path intersecting the current path 1006 may occur because the user of the mobile device may perceive the two sides of the same potential path to be located at different distances. The projected points held at a predetermined distance from the intersection with current path 1006 for each side of the road may have a different perceived vertical distance to the pedestrian user. However, the mobile device may group such labels together for display as a single grouped label. For example, labels 1030a and 1030b may be grouped together as label 1050. Similarly, labels 1034a and 1034b may be grouped together as label 1052. When grouping two labels for the same potential path together in this manner, the mobile device may use the vertical location of the label closest to the common point of the screen 1054 as the vertical display location of the grouped label. For example, the grouped label 1050 may be determined to be placed at a vertical location that is spaced a distance 1048 from the bottom of the navigation interface. The vertical location 1048 for the grouped label 1050 may correspond to the vertical location of label 1030a because the vertical location of label 1030a may be closer to the common point of the screen 1054 than the vertical location of label 1030b.

In some embodiments, the common point of the screen at which the direction vectors originate may be shifted down in the navigation interface. For example, the point 1054 at which the relative direction vectors originate may be shifted from a vertical location at the center of the screen that is spaced a distance 1046 from the bottom of the navigation interface to a vertical location 1066 spaced a distance 1066 from the bottom of the navigation interface. While distance 1046 may correspond to a length that is 50% of the total height of the navigation interface, distance 1066 may correspond to a length that is a smaller percentage of the total height of the navigation screen interface (e.g., 30%). By translating the navigation interface down by a set distance, the labels that are not at the extreme ends (e.g., the top and bottom) of the navigation interface may be shifted down by the distance that the navigation interface is shifted down. For example, label 1050 may be shifted down so that it is now spaced a distance 1068 from the bottom of the navigation interface instead of being spaced a distance 1048 from the bottom of the navigation interface. By translating the navigation interface down in this manner, more room is made available in the navigation interface for labels corresponding to upcoming potential paths instead of focusing half of the navigation interface on labels for potential paths that are behind the current location of the pedestrian user. With the assumption being that most pedestrian users are more interested in what is ahead of them instead of what is behind them, the majority of the navigation interface may be dedicated to displaying labels for upcoming potential paths. A translation of the navigation screen as described above may accomplish such a goal. In this manner, the spacing between a label for an upcoming object and an indicator identifying the current location may be based on a distance between the current location and the projected point on that object (e.g., potential path or POI).

As shown by exemplary illustration 1060 of FIG. 10D, label 1050 may be spaced a distance 1064 from label 1042 while label 1052 may be spaced a distance 1076 from label 1052. The labels displayed in exemplary illustration 1060 and their spacing may correspond to the final display arrangement of the navigation interface 1000 of FIG. 10A. For example, label 1042, 1048, and 1052 may correspond to labels 1008, 1010, and 1012 of FIG. 10A. The distance 1064 between labels 1042 and 1050 may correspond to spacing 1014 between labels 1008 and 1010. Similarly, the distance 1076 between labels 1050 and 1052 may correspond to spacing 1016 between labels 1010 and 1012.

In some embodiments, the mobile device may determine the opacity and blurriness of the labels based on the distance between the current location and the location of the corresponding path. For example, labels for potential paths that are the closest to the current location may be displayed with the highest relative opacity level and least blurry level.

In some embodiments, labels for POIs may be displayed in the radar view navigation interface 1000 of FIG. 10A as well as labels for nearby potential paths.

In some embodiments, the radar view navigation interface 1000 of FIG. 10A may comprise labels for only POIs. For example, upon receiving a user selection to view all the POIs near the current location of the user, the radar view navigation interface 1000 may be displayed including labels for only POIs. In other embodiments, the navigation interface 1000 may include labels for nearby potential paths as well as nearby POIs to the current location of the user. The user may be provided the option of filtering POIs displayed on the navigation interface 1000 according to different categories of POIs. There may be a preset maximum number of POI labels allowed to be displayed on the navigation interface 1000.

Figure 11A:
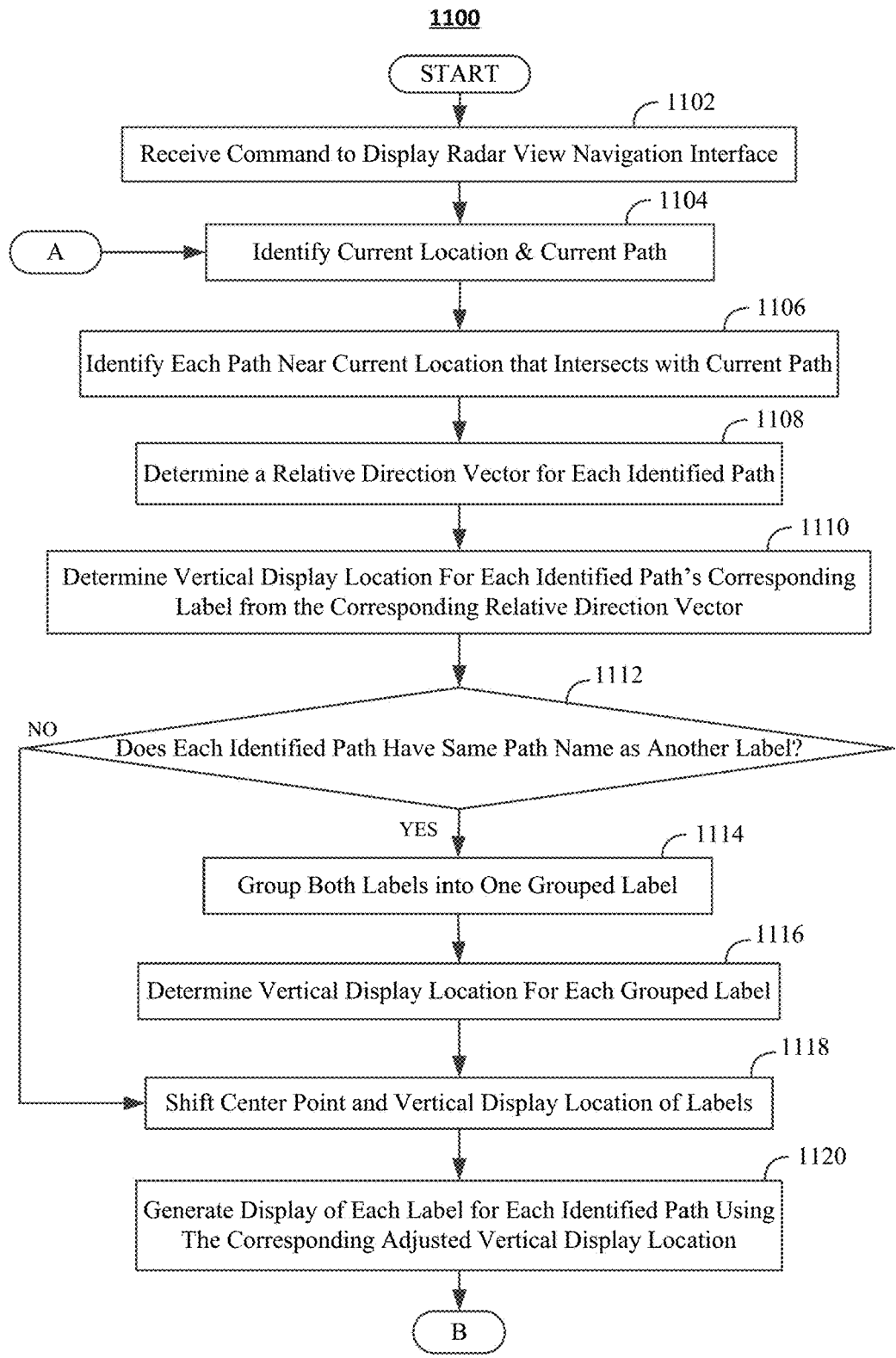
FIGS. 11A and 11B illustrate an example process flow diagram for generating the third navigation user interface in accordance with various embodiments.
Figure 11B:
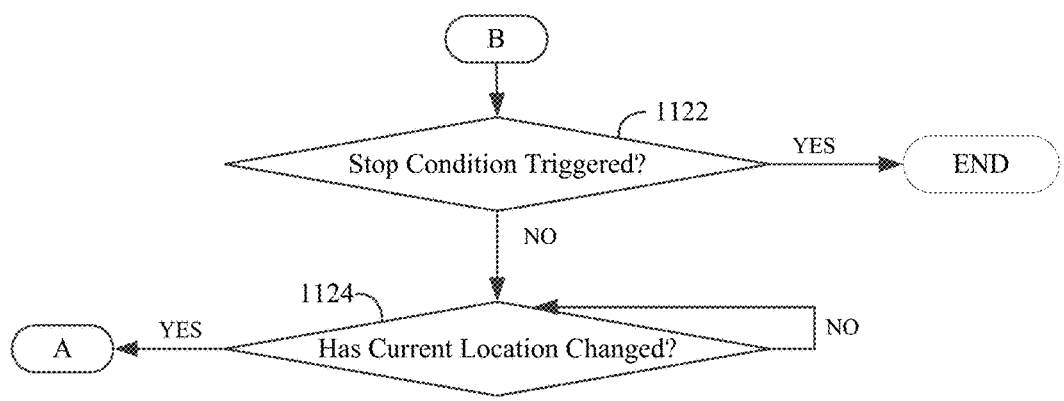

FIGS. 11A and 11B illustrate an example process flow diagram for generating the third navigation user interface. The example method 1100 of FIGS. 11A and 11B may be performed by the mobile device 102 of FIG. 1.

At step 1102, a command may be received to display the radar view navigation interface. Such a command may be received by the mobile device if the user requests display of the radar view navigation interface. Additionally or alternatively, such a command may be received if the mobile device determines that the user has toggled an option to display the radar view interface amongst different navigation interface options.

At step 1104, the mobile device may identify current location and current path. The mobile device may identify its current location using several different techniques described above in FIG. 1. For example, the mobile device may include a GPS communication circuit that communicates with satellites directly or indirectly through other computing devices to obtain the position of the mobile device. Additionally or alternatively, the mobile device may obtain its location by detecting signals from nearby wireless access points and determining signal strength from such access points. By using the determined signal strength of each wireless access point, the mobile device may be able to determine distance from each wireless access point to pinpoint the location of the mobile device. The mobile device may also be able to identify its own bearing using an on-board compass. By identifying its current location, the mobile device may be able to extract the current path on which the mobile device is located by correlating the current location with road information extracted from road data or map data databases, and/or by comparing a current and previous location. Identifying the current location in step 1104 may also comprise, for performances of step 1104 after a location change determination has initially occurred (e.g., as the method loops back to step 1104 from step 1124, as described below), selecting a new location that was determined as part of determining a location change.

At step 1106, the mobile device may identify each potential path near the current location that intersects with the current path. The mobile device may identify, from the extracted road data and an electronic horizon, which potential paths intersect the current path within a predetermined distance of the current location of the mobile device. For example, the mobile device may only determine at a time all the potential paths within 300 meters of the current location of the mobile device that intersect the current path.

At step 1108, the mobile device may determine a relative direction vector for each of the different identified potential paths. Such a step may combine processes described in steps 808 and 810 of FIG. 8. For example, for each potential path identified in step 1106, the mobile device may calculate a path direction vector. For each identified potential path, such a path direction vector may be calculated by connecting the point at which the identified path intersects with the current path to a next shape point or node in the road. Such a shape point and/or node may be identified for each of the different identified potential paths from the extracted map data defining points along the identified path. The resulting path direction vector for each path may be used to form the direction of the identified path. Such a path direction vector may not be subject to change as the current location of the mobile device changes. Next, the mobile device may determine a relative direction vector for each of the different identified potential paths from the current location using the corresponding path direction vector. Using the current location of the mobile device, the mobile device may calculate a projected point along the corresponding path direction vector of each identified path. The projected point may be a point on the path direction vector at a predetermined distance from where the identified path intersects the current path. For each of the different identified paths, the mobile device may calculate a relative direction vector by connecting the current location of the mobile device with the corresponding projected point. For each of the different identified paths, the corresponding relative direction vector may indicate a relative direction of the identified path as seen from the perspective of the current location of the mobile device and may change as the current location of the mobile device changes.

At step 1110, the mobile device may determine a vertical display location for each of the different identified path's label on the navigation interface on which to display a corresponding label for each identified path. For each label, the vertical location may be determined from the vertical location of the display interface on which the corresponding relative direction vector for the corresponding potential path terminates. By using the vertical component of the corresponding relative direction vector, the mobile device may be able to place a horizontal label for each identified path with respect to other labels at a relative distance that the pedestrian user would perceive the corresponding potential path for that label with respect to that of other potential paths for labels also displayed in the navigation interface.

At step 1112, the mobile device may determine whether each identified path has the same path name as another label. For example, the mobile device may determine whether each label corresponds to a potential path that intersects the current path on both the left and right side of the current path such that the potential path has the same name on both the left and right side of the current path. Such information may be obtained by examining the extracted road data or electronic horizon data. If it is determined that each identified path does not have the same path name as another label, the method 1100 may proceed to step 1118.

At step 1114, in response to determining that an identified path name has the same path name as another label, the mobile device may group both corresponding labels for that identified path into one grouped label. For example, the mobile device may determine that instead of displaying two separate labels for the same potential path, only one label may be shown. The mobile device may also determine that the grouped label is to span the entire horizontal length of the navigation interface.

At step 1116, the mobile device may determine a vertical display location for each of grouped labels that are to be generated. For each grouped label, the mobile device may determine the vertical locations of both corresponding individual labels to be grouped together and may select the vertical location of the label that is spaced closest to a common point on the screen (e.g., the representation of the current location of the mobile device). By selecting the vertical display location of the closest potential path for the two identified paths for which the labels are being grouped together, the mobile device may place the grouped label at a position of the label corresponding to the path closest to the user.

At step 1118, the mobile device may shift the common point of the navigation interface and the vertical display location of multiple labels. By translating the navigation interface down by a fixed distance, the labels that are not at the extreme ends (e.g., the top and bottom) of the navigation interface may be shifted down by the distance that the navigation interface is shifted down. By translating the navigation interface down in this manner, more room is made available in the navigation interface for labels corresponding to upcoming potential paths instead of focusing half of the navigation interface on labels for potential paths that are behind the current location of the pedestrian user. The mobile device may adjust the vertical location of labels that were not otherwise positioned at the extreme top and bottom of the navigation interface to adjust for the downshift of the common point of the navigation interface. Such a shift down of the common point of the navigation interface may only occur once and may not repeat as steps 1104-1116 and 1120 repeat as the current location of the mobile device changes.

At step 1120, the mobile device may generate display of labels for each of the different identified paths using the corresponding adjusted vertical display location determined for each of the corresponding labels at step 1118. The mobile device may generate labels including the name of the identified corresponding paths on the navigation interface. The labels may be positioned at a downshifted common point of the display screen that has been determined at step 1118. For example, the vertical location for each label on the navigation interface may be identified from the vertical position calculated for that label up until step 1118. Each label may span the entire length of the navigation interface if the corresponding potential path intersects the current path on both the right and left side of the roads. However if the corresponding potential path only intersects the current path on the left side or the right side of the current path, then the mobile device may display the corresponding label on only the left half or the right half of the navigation interface. The opacity and blurriness level of each label may be determined based on the distance between the corresponding path of the corresponding label and the current location of the mobile device.

At step 1122, the mobile device may determine whether a stop condition has been triggered. For example, the mobile device may determine whether the user has indicated that they wish to stop displaying the navigation interface. The mobile device may monitor whether it has received instructions from the user to close the navigation interface, to display a different navigation interface, to turn off or minimize a mobile application that displays the navigation interface, and/or turn off the mobile device. Each of these instructions from the user may trigger a stop condition indicating the mobile device to terminate method 1100 and stop performing computations related to the navigation interface and/or to stop display the navigation interface. If such a stop condition has not been triggered, the method may proceed to step 1124 to determine whether the current location of the mobile device has changed.

At step 1124, the mobile device may determine whether the current location has changed. By monitoring the current location of the mobile device, the mobile device may determine at a later time whether the current location has changed. Such a determination may be made periodically or in response to an indication received from an inertial sensor of the mobile device indicating movement of the mobile device. If the mobile device determines that the current location of the mobile device has not changed, the mobile device may periodically perform such a determination until it determines that the current location has changed.

In response to determining that the current location has changed, the method may return to step 1104 to determine the updated current location of the mobile device. The mobile device may identify the new location using the techniques described in FIG. 1. Steps 1106-1120 are then repeated in the iteration of step 1106. For example, the mobile device may identify new potential paths that intersect the updated current path (if the current path has changed along with the location) within the predetermined distance of the updated current location. Labels for potential paths that are no longer within the predetermined distance of the updated current location may be removed from the display in the navigation interface.

In the iteration of step 1108, the mobile device may determine an updated relative direction vector for each identified path. The updated relative directions may be calculated by connecting the updated current location of the mobile device with each projected point corresponding to the path direction vector at a predetermined distance from where each corresponding identified path intersects the current path. In the iteration of step 1110, the mobile device may determine an updated vertical display location for each identified path's label. By using the updated relative direction of each identified path, the vertical component at which each corresponding updated relative direction vector in a non-downshifted navigation interface (e.g., if the relative direction were to originate from the common point of the navigation interface) would terminate may be determined. In the iteration of step 1114, each updated vertical location may be adjusted based on grouping the label for that path with that of any other label with the same name. For example, if another label with an updated vertical location has the same path name, the labels may be grouped together and the vertical location of the corresponding label that is closest to the current location of the mobile device may be used as the updated vertical location of the corresponding grouped label in the iteration of step 1116. In the iteration of step 1118, the updated vertical location for each identified potential path may be adjusted for the downshift of the navigation interface. The vertical location for each such potential path's corresponding label may be adjusted proportionate to the distance that the common point of the navigation screen has been downshifted to make room for labels for upcoming potential paths. In the iteration of step 1120, the mobile device may update the display of each label for each identified path using the corresponding updated vertical display location. For example, the mobile device may update the vertical location for each label at which that label is displayed in the navigation interface. Not all labels may have their vertical location be altered. For example, the labels at the top and bottom of the navigation interface may be displayed at the same location if it is determined that their corresponding potential paths are still within a predetermined distance of the current location. The opacity and blurriness level for each given label may be recalculated based on the distance between the corresponding path of the label and the updated current location of the mobile device. Additional iterations of steps 1104-1120 may occur after each position change of the mobile device, in a manner described above, until a stop condition is reached.

Although the method 1100 identifies current paths, it may also, or alternatively, identify POIs near the current location and generate labels for them in the same manner as that for potential paths as described above in method 1100.

Figure 12A:
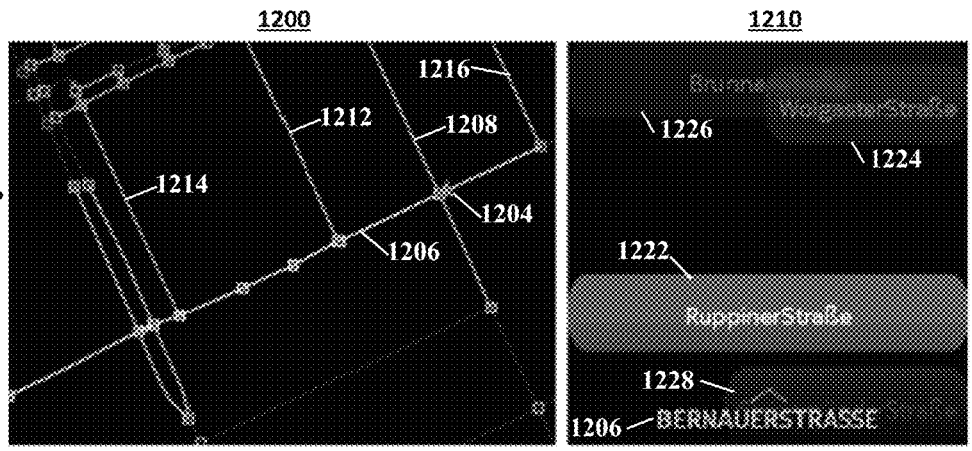
FIGS. 12A, 12B, and 12C illustrate example screenshots of a third navigation interface display that updates as the user walks through a city in accordance with various embodiments.
Figure 12B:
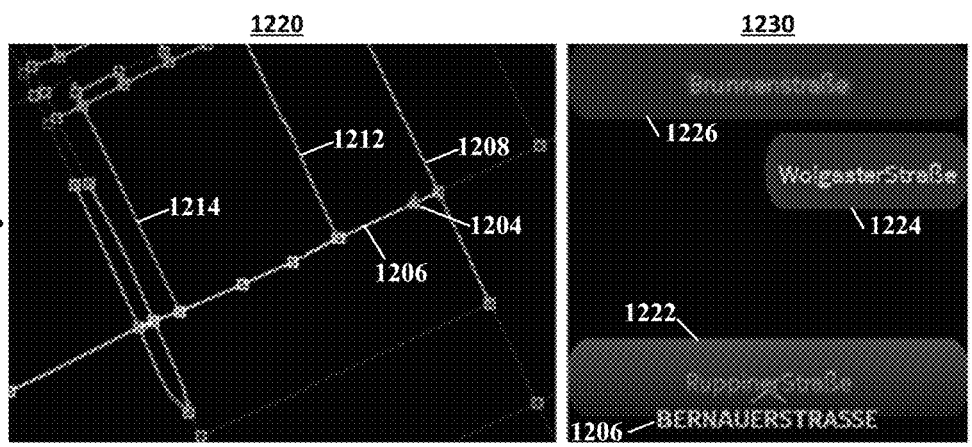
Figure 12C:
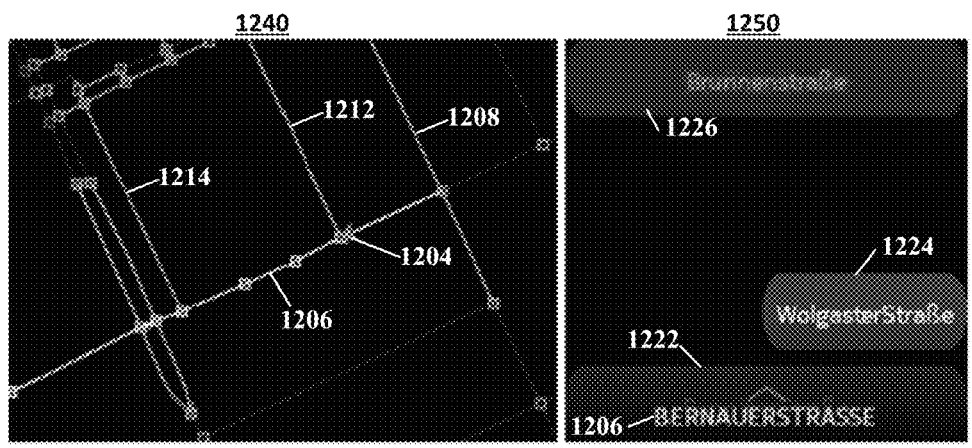

FIGS. 12A, 12B, and 12C illustrate example screenshots 1210, 1230, and 1250 of the third navigation interface display (the 'radar view' navigation interface) that updates as the user walks through a city. Screenshots 1210, 1230, and 1250 are shown adjacently to their electronic horizon data counterparts 1200, 1220, and 1240, respectively for ease of illustration. The electronic horizon data as superimposed onto a road map may not be displayed along with the 'radar view' navigation interface on the mobile device screen, but is shown here for ease of understanding. Screenshot 1210 is a snapshot of the navigation interface as the pedestrian user of the mobile device sees it at an initial time (e.g., when the pedestrian user first opens a mobile application displaying the navigation interface). Screenshot 1230 is a snapshot of the navigation interface at a second time, which occurs after the first time, when the pedestrian user has moved along on the current path 1206. The current location of the user as displayed in the navigation interface of screenshot 1230 may be different than the position at which the user was located on at the first time, as displayed in screenshot 1210. Screenshot 1250 is a snapshot of the navigation interface at a third time, which occurs after the first and second times, when the pedestrian user has moved even further along on the current path 1206.

As the mobile device moves, the current location 1204 may be updated and the display of the navigation interface may also be updated. As the navigation interface updates to reflect the movement of the mobile device, the labels for each upcoming potential path displayed in the navigation interface may change their relative vertical position as the mobile device moves further along on the current path 1206 and the relative direction to the upcoming path changes from the perspective of the pedestrian user. Labels for new upcoming intersections may be displayed and labels for old intersections that the mobile device has long ago already crossed during its movement may be removed from display on the navigation interface.

In the embodiment shown in FIGS. 12A, 12B, and 12C, the navigation interface may be updated as the current location is updated. At an initial time, as shown in FIG. 12A, the mobile device may use electronic horizon information 1200 to identify that potential paths 1208, 1212, 1214, and 1216 intersect the current path 1206 within a predetermined distance of the current location 1204. Accordingly, the mobile device may calculate relative direction vectors from the current location 1206 to these potential paths. The mobile device may generate labels 1222, 1224, 1226, and 1228 on the navigation interface display 1210 for the potential paths 1208, 1212, 1214, and 1216, respectively. The labels 1222, 1224, 1226, and 1228 may each be positioned according to the adjusted vertical position of relative direction vectors of potential paths 1208, 1212, 1214, and 1216, respectively.

FIG. 12B shows a navigation interface 1230 at a second time after the first time when the user's current location has changed and when the relative direction vectors for potential paths 1208, 1212, 1214, and 1216 have been updated. As the current location 1204 is updated at the second time, as shown in electronic horizon 1220, upon the user movement from the initial location shown in FIG. 12A, the relative direction vectors for potential paths 1208, 1212, 1214, and 1216 may be recalculated using the updated current location 1204. It may be determined that potential path 1216 is no longer within a predetermined distance of the current location 1204 and accordingly, corresponding label 1228 may be removed from the display of navigation interface 1230. The vertical positions at which labels 1222, 1224, and 1226 are displayed may be updated in the navigation interface 1230 according to the corresponding updated relative direction vectors for potential paths 1208, 1212, and 1214, respectively.

FIG. 12C shows that at a third time after the second time shown by FIG. 12B, the user's current location 1204 has changed from its previous position in electronic horizon 1220. For example, the user's current location 1204 has moved further along the current path 1206 in electronic horizon 940 than in electronic horizon 1220. As the current location 1204 is updated once again, a determination may be made that different potential paths are now within the predetermined distance from the current location 1204. It may be determined that potential paths 1208, 1212, and 1214 are still within the predetermined distance of the updated current location. Accordingly, their corresponding relative direction vectors may be updated based on the updated current location 1204. The vertical position of labels 1222, 1224, and 1226 may be updated in the navigation interface 1250 according to the corresponding updated relative direction vectors. The opacity and blurriness levels of labels 1222, 1224, and 1226 may be adjusted based on the distance between the updated current location 1204 and the potential paths 1208, 1212, and 1214.

Figure 13:
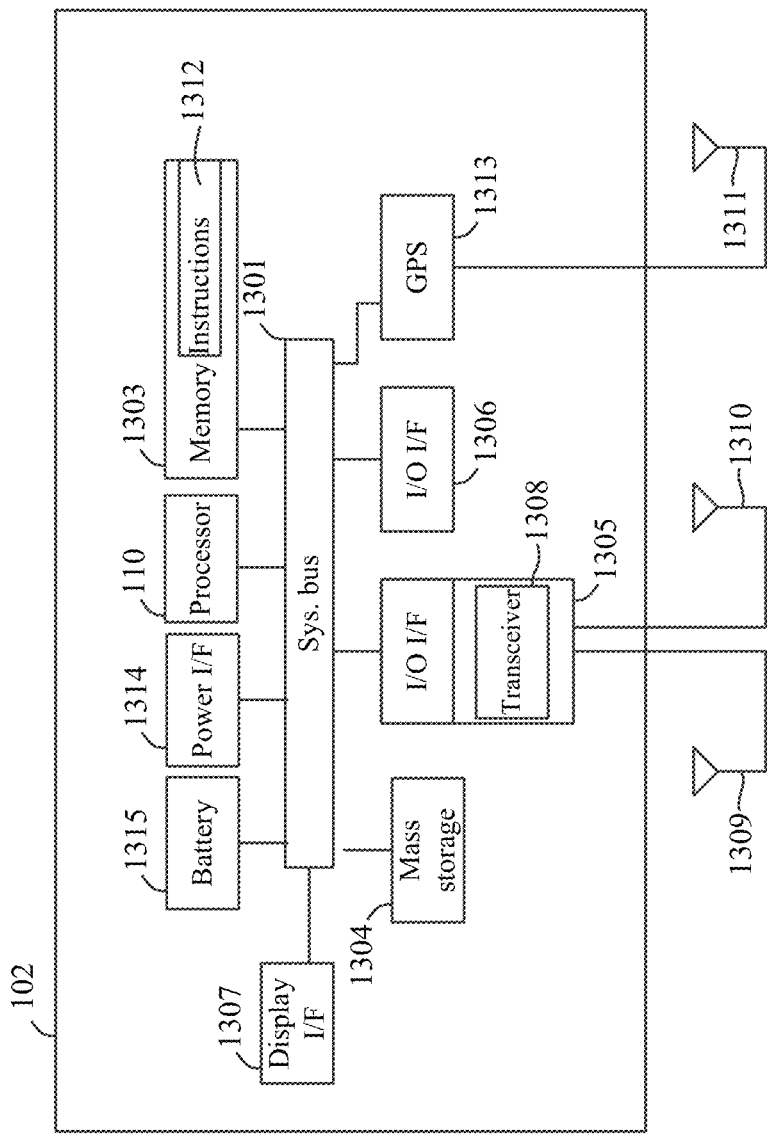
FIG. 13 shows an illustrative computing device in accordance with various embodiments.

FIG. 13 shows an illustrative computing device 102 that may be used to implement the methods and processes described herein (such as those described with respect to FIGS. 2-12). Various devices described herein may include some or all of the illustrated components of mobile device 102. Device 102 may include a system bus 1301 which may operatively connect various combinations of one or more processors 110 one or more memories 1303 (e.g., random access memory, read-only memory, etc.), mass storage device(s) 1304, input-output (I/O) interfaces 1305 and 1306, display interface 1307, and global positioning system (GPS) chip 1313, power interface 1314, and battery 1315.

I/O interfaces 1305 may include one or more transceivers 1308, antennas 1309 and 1310, and other components for communication in the radio spectrum. Interface 1306 and/or other interfaces (not shown) may similarly include a transceiver, one or more antennas, and other components for communication in the radio spectrum, and/or hardware and other components for communication over wired or other types of communication media. GPS chip 1313 may include a receiver, an antenna 1311 and hardware and/or software configured to calculate a position based on GPS satellite signals.

Memory 1303 and mass storage device(s) 1304 may store in a non-transient manner (permanently, cached, etc.), machine executable instructions 1312 (e.g., software) executable by the processor(s) 110 for controlling operation of a device (such as mobile device 102) according to various embodiments or to implement the methods and processes described herein (such as those described with respect to FIGS. 2-12).

Mass storage 1304 may include a hard drive, flash memory or other type of non-volatile storage device. Processor(s) 110 may be, e.g., an ARM-based processor such as a Qualcomm Snapdragon or an x86-based processor such as an Intel Atom or Intel Core. Device 102 may also include a touch screen (not shown) and physical keyboard (also not shown). A mouse or key station may alternately or additionally be employed. A physical keyboard might optionally be eliminated. As previously explained in connection with FIG. 1, the computing device 102 may also include a compass. Additionally, the computing device 102 may also include a location module, data extraction module, electronic horizon module, and visualization application corresponding to location module 116, data extraction module 112, electronic horizon module 114, and visualization application 120 of FIG. 1.

The foregoing description of embodiments has been presented for purposes of illustration and description. The foregoing description is not intended to be exhaustive or to limit embodiments to the precise form explicitly described or mentioned herein. Although example embodiments are described above, the various features and steps may be combined, divided, omitted, rearranged, revised and/or augmented in any desired manner, depending on the specific outcome and/or application. Modifications and variations are possible in light of the above teachings or may be acquired from practice of various embodiments. All alterations, modifications, combinations, sub-combinations, permutations, and improvements of the above example embodiments, whether or not specifically discussed, are intended to be within the spirit and scope of the disclosure. Accordingly, the foregoing description is by way of example only, and not limiting. This patent is limited only as defined in the following claims and equivalents thereto.

The invention claimed is:

1. A method comprising:
   identifying, by a computing device, a current location using a global positioning service communications circuit and a current path using a map database on which the computing device is located;
   identifying, by the computing device, one or more upcoming locations not on the current path;
   for each of the one or more upcoming locations,
      identifying an upcoming location path to an upcoming location of the one or more upcoming locations;
      identifying an intersection of the current path and the upcoming location path;
      identifying a point located on the upcoming location path, the point located a predetermined distance from the intersection and a distance from the upcoming location; and
      determining a relative direction vector corresponding to the upcoming location, the corresponding relative direction vector representing a direction from the current location to the point; and
   generating, by the computing device, a display comprising a label identifying each of the one or more upcoming locations, wherein a display position of each of the labels is based on the relative direction vector corresponding to the upcoming location.

2. The method of claim 1, wherein the display position of each of the labels is determined to be at least one of:
   at a location of the point,
   on a horizontal level of the point, and
   oriented along the relative direction vector.

3. The method of claim 1, wherein the one or more upcoming locations comprise at least one or more points of interests.

4. The method of claim 1, further comprising:
   determining that the current location of the computing device has changed, resulting in an updated current location;
   determining an updated relative direction vector for each upcoming location based on the updated current location; and
   updating the display of each label based on a corresponding updated relative direction vector, wherein an updated display position of each label is based on a direction of the corresponding updated relative direction vector in the display.

5. The method of claim 1, further comprising:
   determining that the current location of the computing device has changed, resulting in an updated current location;
   identifying, by the computing device, an updated plurality of upcoming locations within a vicinity of the updated current location;
   removing, from the display, labels that correspond to locations that are no longer included within the updated plurality of upcoming locations; and
   generating for display, by the computing device, at least one label corresponding to at least one upcoming locations that was previously not included in the display.

6. The method of claim 1, wherein for each upcoming locations, the predetermined distance from the intersection to a corresponding point is based on at least one of:
   a number of locations in a vicinity of the current path, and
   an area of a region of the vicinity of the current path.

7. The method of claim 1, wherein each label is displayed with one end positioned at a first point of the display and another end positioned at a second point in the display such that each label is presented relative to the first point of the display according to its corresponding relative direction vector.

8. A method comprising:
identifying, by a computing device, a current location using a global positioning service communications circuit and a current path using a map database on which the computing device is located;
identifying, by the computing device, one or more upcoming locations in a vicinity of the current path; and
for each of the one or more upcoming locations,
identifying an upcoming location path to an upcoming location of the one or more upcoming locations;
identifying an intersection between the current path and the upcoming location path,
identifying a point located on the upcoming location path, the point located a predetermined distance from the intersection and a first distance from the upcoming location,
determining a second distance between the current location to the point; and
displaying, by the computing device, a label identifying the upcoming location, wherein a spacing between the label and an indicator identifying the current path is based on the determined second distance.

9. The method of claim 8, wherein determining the second distance for each upcoming location further comprises:
determining a relative direction vector corresponding to the upcoming location, the corresponding relative direction vector representing a direction from the current location to the point; and
determining a distance component of the relative direction vector.

10. The method of claim 9, further comprising:
determining that the current location of the computing device has changed, resulting in an updated current location;
determining an updated relative direction vector for each upcoming location between the updated current location to the point; and
updating the display of each label based on the updated relative direction vector, wherein the label is positioned on the display at a fourth distance from the indicator identifying the current path, the fourth distance corresponding to the distance component of a corresponding updated relative direction vector.

11. The method of claim 8, further comprising:
identifying a plurality of points of interests for a user of the computing device;
identifying one or more of the plurality of points of interests that are located within the vicinity of the current location;
for each of the one or more identified points of interests,
determining a relative direction vector from the current location to a location of the point of interest; and
generating for display, by the computing device, a label identifying the point of interest, wherein the label is positioned on the display at a third distance from an indicator identifying the current location, the third distance corresponding to a distance component of the relative direction vector.

12. The method of claim 8, further comprising:
determining that the current location of the computing device has changed, resulting in an updated current location;
identifying, by the computing device, an updated plurality of upcoming locations within the vicinity of the updated current location;
removing, from the display, labels that correspond to locations that are no longer included within the updated plurality of upcoming locations; and
generating for display, by the computing device, one or more labels corresponding to one or more upcoming locations that were previously not included in the display.

13. An apparatus comprising: at least one processor; and at least one memory storing computer program code, the at least one memory and computer program code configured to, with the at least one processor, cause the apparatus at least to: identify a current location using a global positioning service communications circuit and a current path using a man database on which the apparatus is located; identify one or more upcoming locations in a vicinity of the current path; for each of the one or more upcoming locations, identify an upcoming location path to an upcoming location of the one or more upcoming locations, identify an intersection of the current path and the upcoming location path, identify a point located on the upcoming location path, the point located a predetermined distance from the intersection and a distance from the upcoming location; and determine a relative direction vector corresponding to the upcoming location, the corresponding relative direction vector representing a direction from the current location to the point; and generate a display comprising a label identifying each of the upcoming locations, wherein a display position of each of the labels is based on the relative direction vector corresponding to the upcoming location.

14. The apparatus of claim 13, wherein the at least one memory and the computer program code are further configured to, with the at least one processor, cause the apparatus at least to:
identify a plurality of points of interests for a user of the apparatus;
identify one or more of the plurality of points of interests that are located within the vicinity of the current path;
for each of the one or more identified points of interests:
determine a direction from the current location to a location of the point of interest; and
generate, for display, a label identifying the point of interest, wherein a display position of the label is based on the determined direction in the display.

15. The apparatus of claim 13, wherein the at least one memory and the computer program code are further configured to, with the at least one processor, cause the apparatus at least to:
determine that the current location of the apparatus has changed, resulting in an updated current location;
determine an updated relative direction vector for each upcoming location based on the updated current location; and
update the display of each label based on a corresponding updated relative direction vector, wherein an updated display position of each label is based on a direction of the corresponding updated relative direction vector in the display.

16. The apparatus of claim 13, wherein the at least one memory and the computer program code are further configured to, with the at least one processor, cause the apparatus at least to:
determine that the current location of the apparatus has changed, resulting in an updated current location;
identify an updated plurality of upcoming locations within the vicinity of the updated current location;

remove, from the display, labels that correspond to locations that are no longer included within the updated plurality of upcoming locations; and generate, for display, one or more labels corresponding to one or more upcoming locations that were previously not included in the display.

17. The apparatus of claim 13, wherein each label is displayed with one end positioned at a first point of the display and another end positioned at a second point in the display such that each label is presented relative to the first point of the display according to its corresponding relative direction vector.

* * * * *